US012793436B2

(12) United States Patent
Hennage et al.

(10) Patent No.: US 12,793,436 B2
(45) Date of Patent: Nov. 10, 2026

(54) WORKING VEHICLE AND TRAVELING MANAGEMENT SYSTEM

(71) Applicant: Kubota Corporation, Osaka (JP)

(72) Inventors: Daniel Allan Hennage, San Rafael, CA (US); Edward Lee Koch, San Rafael, CA (US); Alireza Janani, San Rafael, CA (US)

(73) Assignee: KUBOTA CORPORATION, Osaka (JP)

( * ) Notice: Subject to any disclaimer, the term of this patent is extended or adjusted under 35 U.S.C. 154(b) by 79 days.

(21) Appl. No.: 19/028,013

(22) Filed: Jan. 17, 2025

(65) Prior Publication Data

US 2026/0120478 A1 Apr. 30, 2026

Related U.S. Application Data

(60) Provisional application No. 63/551,850, filed on Feb. 9, 2024.

(51) Int. Cl.

| | |
|---|---|
| ***G06V 20/58*** | (2022.01) |
| ***A01B 69/04*** | (2006.01) |
| ***A01B 76/00*** | (2006.01) |
| ***G05D 1/243*** | (2024.01) |
| ***G05D 107/20*** | (2024.01) |
| ***G05D 111/10*** | (2024.01) |
| ***G06T 7/73*** | (2017.01) |
| ***G06V 10/12*** | (2022.01) |

(52) U.S. Cl.

CPC ............ *G06V 20/58* (2022.01); *A01B 69/008* (2013.01); *A01B 76/00* (2013.01); *G05D 1/243* (2024.01); *G06T 7/73* (2017.01); *G06V 10/12* (2022.01); *G05D 2107/21* (2024.01); *G05D 2111/10* (2024.01); *G06T 2207/30208* (2013.01); *G06T 2207/30261* (2013.01)

(58) Field of Classification Search

None

See application file for complete search history.

(56) References Cited

U.S. PATENT DOCUMENTS

| | | | | |
|---|---|---|---|---|
| 2021/0173393 | A1* | 6/2021 | Agarwal | B60W 50/00 |
| 2021/0230842 | A1* | 7/2021 | Vorobiev | G06T 7/50 |
| 2022/0410898 | A1* | 12/2022 | Nett | B60W 60/0025 |

(Continued)

FOREIGN PATENT DOCUMENTS

| | | | | | |
|---|---|---|---|---|---|
| JP | 2023090535 A | * | 6/2023 | | E02F 9/24 |
| JP | 7303094 B2 | * | 7/2023 | | B60K 35/22 |
| WO | WO-2022051329 A1 | * | 3/2022 | | B62D 53/08 |

*Primary Examiner* — Amelia Vorce

(74) *Attorney, Agent, or Firm* — Keating & Bennett, LLP

(57) ABSTRACT

A working vehicle includes a traveling body including a coupler to which a working device is connected, a first camera attached to the traveling body, a second camera attached to the traveling body, a first marker attached to the working device, a second marker attached to the working device, and a controller. The controller is configured or programmed to determine a status of the working device based on detection data detected by the first camera and/or the second camera. The first camera faces a rearward direction and a first outward direction of the working vehicle, and the second camera faces the rearward direction and a second outward direction of the working vehicle opposite to the first outward direction of the working vehicle.

8 Claims, 20 Drawing Sheets

(56) References Cited

U.S. PATENT DOCUMENTS

| | | | | |
|---|---|---|---|---|
| 2023/0035181 | A1* | 2/2023 | Lee | B60R 1/24 |
| 2023/0320275 | A1* | 10/2023 | Christiansen | A01D 41/1217 701/50 |
| 2024/0087278 | A1* | 3/2024 | Vorobiev | G05D 1/0234 |
| 2024/0096184 | A1* | 3/2024 | Kuhns | A01D 43/07 |
| 2024/0202970 | A1* | 6/2024 | Olutomilayo | G06T 7/74 |
| 2025/0248325 | A1* | 8/2025 | Ross | G06V 20/188 |
| 2026/0077854 | A1* | 3/2026 | Jaszlics | B64C 13/18 |

* cited by examiner

WORKING VEHICLE AND TRAVELING MANAGEMENT SYSTEM

BACKGROUND OF THE INVENTION

Field of the Invention

The present invention relates to a working vehicle such as a tractor and to a traveling management system for the working vehicle.

SUMMARY OF THE INVENTION

A working vehicle according to an example embodiment of the present invention includes a traveling body including a coupler to which a working device is connected, a first camera attached to the traveling body, a second camera attached to the traveling body, a first marker attached to the working device, a second marker attached to the working device, and a controller configured or programmed to determine a status of the working device based on detection data detected by the first camera and/or the second camera, and the first camera faces a rearward direction and a first outward direction of the working vehicle, the second camera faces the rearward direction and a second outward direction of the working vehicle opposite to the first outward direction of the working vehicle, an innermost portion of the first marker is located outside of the first camera in a left-right direction of the working vehicle when the working device has a straight posture with respect to the traveling body, and an innermost portion of the second marker is located outside of the second camera in the left-right direction of the working vehicle when the working device has the straight posture with respect to the traveling body.

In a working vehicle according to an example embodiment of the present invention, a first inner edge of a first angle of view of the first camera extends in an inward direction, and a second inner edge of a second angle of view of the second camera extends in an inward direction.

In a working vehicle according to an example embodiment of the present invention, the first inner edge of the first angle of view of the first camera intersects the second inner edge of the second angle of view of the second camera at an intersection point that is located forward of the first marker and the second marker in a front-rear direction of the working vehicle when the working device has a straight posture with respect to the traveling body.

In a working vehicle according to an example embodiment of the present invention, when the working device has the straight posture with respect to the traveling body, the first marker is located within a first angle of view of the first camera, when the working device has the straight posture with respect to the traveling body, the second marker is located within a second angle of view of the second camera, when the first marker is not located within the first angle of view of the first camera, and the first marker and the second marker are located within the second angle of view of the second camera, the controller is configured or programmed to determine the status of the working device based on the first marker and the second marker detected by the second camera, and when the second marker is not located within the second angle of view of the second camera, and the first marker and the second marker are located within the first angle of view of the first camera, the controller is configured or programmed to determine the status of the working device based on the first marker and the second marker detected by the first camera.

In a working vehicle according to an example embodiment of the present invention, when the working device has the straight posture with respect to the traveling body, the first marker is located within a first angle of view of the first camera and is not located within a second angle of view of the second camera; and when the working device has the straight posture with respect to the traveling body, the second marker is located within the second angle of view of the second camera and is not located within the first angle of view of the first camera.

In a working vehicle according to an example embodiment of the present invention, the first marker includes a plurality of first markers located side by side on a first marker bundle; and the second marker includes a plurality of second markers located side by side on a second marker bundle.

In a working vehicle according to an example embodiment of the present invention, each of the plurality of first markers have a same length in a width direction and a same length in a vertical direction, and a distance between the plurality of first markers is less than a distance between the plurality of first markers and a side of the first marker bundle.

In a working vehicle according to an example embodiment of the present invention, when the working device has the straight posture with respect to the traveling body, the first marker bundle is located within a first angle of view of the first camera, when the working device has the straight posture with respect to the traveling body, the second marker bundle is located within a second angle of view of the second camera, when the first marker bundle is not located within the first angle of view of the first camera, and the first marker bundle and the second marker bundle are located within the second angle of view of the second camera, the controller is configured or programmed to determine the status of the working device based on the first marker bundle and the second marker bundle detected by the second camera, and when the second marker bundle is not located within the second angle of view of the second camera, and the first marker bundle and the second marker bundle are located within the first angle of view of the first camera, the controller is configured or programmed to determine the status of the working device based on the first marker bundle and the second marker bundle detected by the first camera.

In a working vehicle according to an example embodiment of the present invention, the controller is configured or programmed to perform object detection and/or autonomous navigation based on detection data from the first camera and the second camera.

DETAILED DESCRIPTION OF THE PREFERRED EMBODIMENTS

Figure 1A:
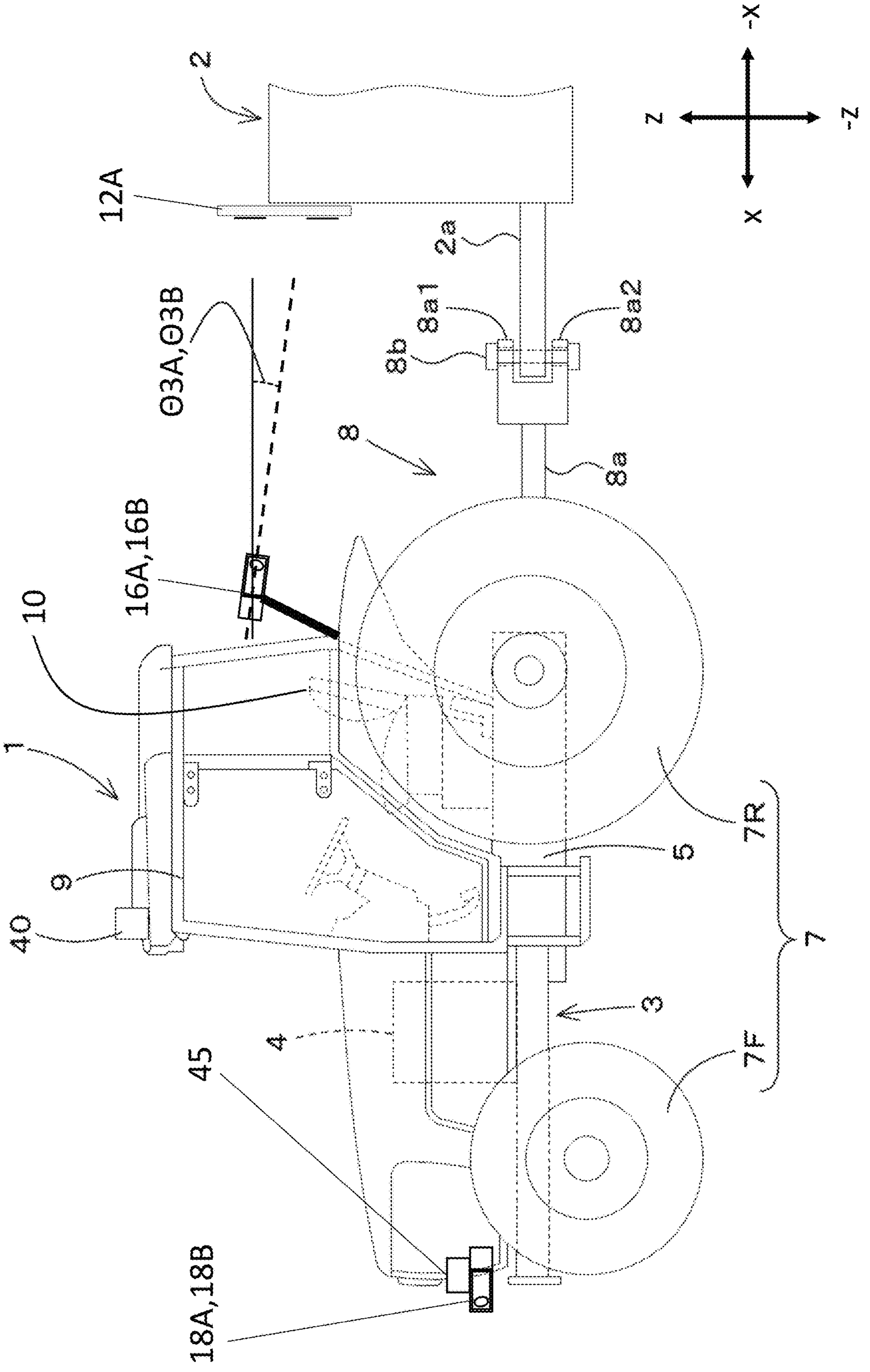
FIG. 1A is a side view of a tractor.

The preferred embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with appropriate reference to the drawings.

Figure 1B:
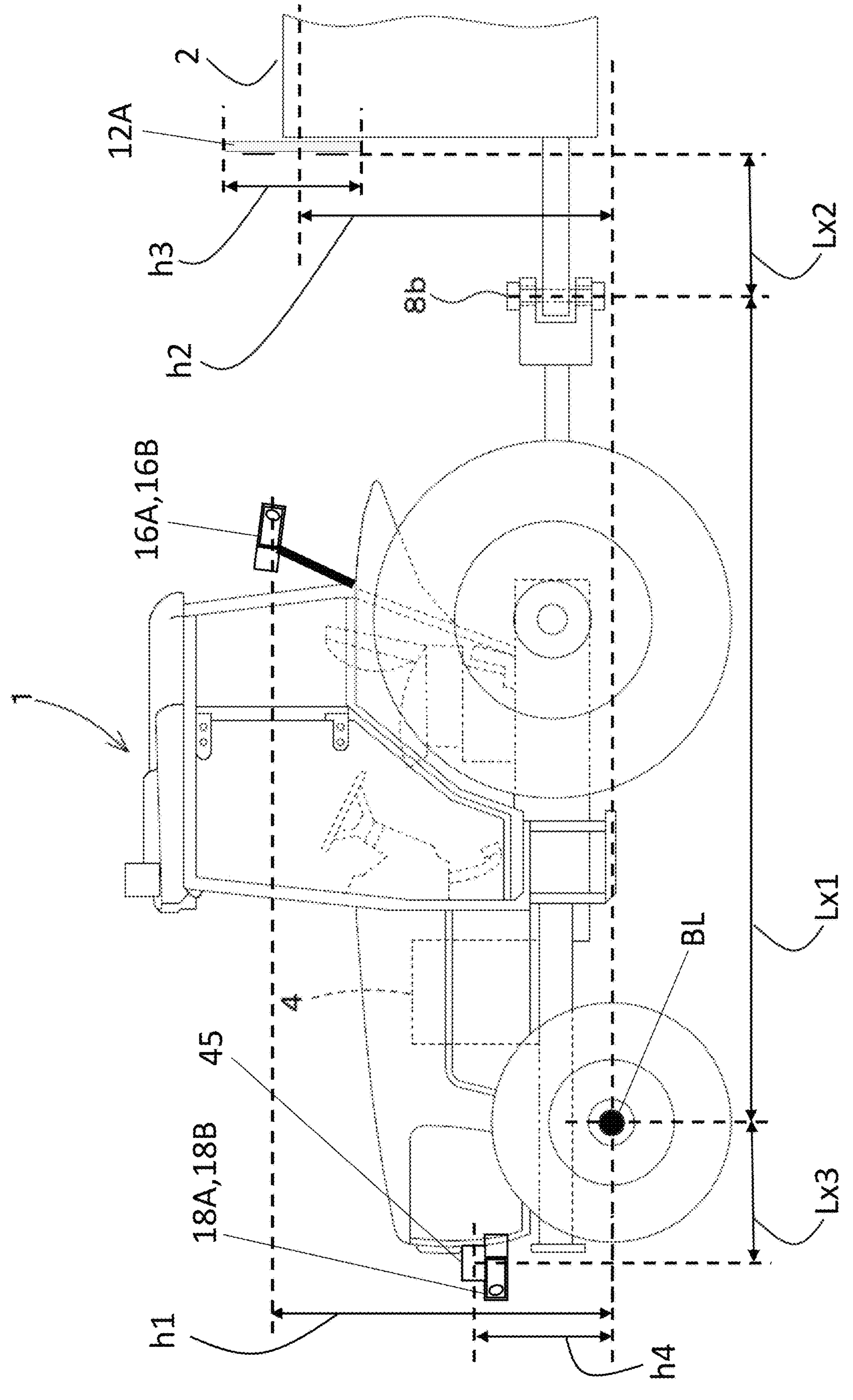
FIG. 1B is a side view of a tractor.

FIG. 1A and FIG. 1B show the working device 2 coupled to the working vehicle 1. As shown in FIG. 1A, with the tractor 1 and the working device 2 stopped, the X direction is a front-to-rear direction (a direction of traveling), the Y direction is a left-to-right direction (a direction of width), and the Z direction is a height direction (a vertical direction).

First, a tractor that is one of the working vehicles will be explained.

The tractor 1 is provided with a traveling machine body 3 with a traveling device 7, a prime mover 4, and a speed-shifter device (transmission) 5. The traveling device 7 is a device having a front wheel 7F and a rear wheel 7R. The front wheels 7F may be tire-type or crawler-type. The rear wheels 7R may also be tire or crawler type. The prime mover 4 is a diesel engine, an electric motor, and the like.

The speed-shifter device 5 is capable of switching the propulsion of the traveling device 7 by shifting gears, and of switching the traveling device 7 between the forward traveling or the backward traveling. A cabin 9 is provided in the traveling machine body 3, and an operator seat 10 is provided in the cabin 9.

At the rear portion of the traveling machine body 3, a coupler portion 8 is provided to connect the working device 2. The coupler portion is a swinging drawbar that connects the working device 2 to the traveling machine body 3 and raises and lowers the working device 2, including a swinging drawbar, a three-point link mechanism, or the like, which does not raise or lower the working device 2. The working device 2 can be attached to and detached from the coupler portion 8. By connecting the working device 2 to the coupler portion 8, the working device 2 can be towed by the traveling machine body 3.

The working device 2 includes a trailer for transporting, a tiller for cultivating, a fertilizer spreader for spraying fertilizer, a transplanting device for planting seedlings, an irrigation device for irrigating, a pesticide sprayer for spraying pesticides, a seed spreader for spreading seeds, a mower device for mowing grasses and the like, a tedder for tedding grasses and the like, a raking device for collecting grasses and the like, a baler device for baling grass and other materials, a combined machine for multiple tasks, and the like. In this preferred embodiment, the description proceeds as the working device 2 is the trailer.

The working device 2 includes a coupling bar 2*a*, which is fixed to the frame of the working device 2 by bolts or other fasteners and is not pivotable in the width direction. The coupling bar 2*a* may be welded to the frame of the working device 2. An insertion hole 2*c* is located in the front end portion of the coupling bar 2*a*.

Figure 2:
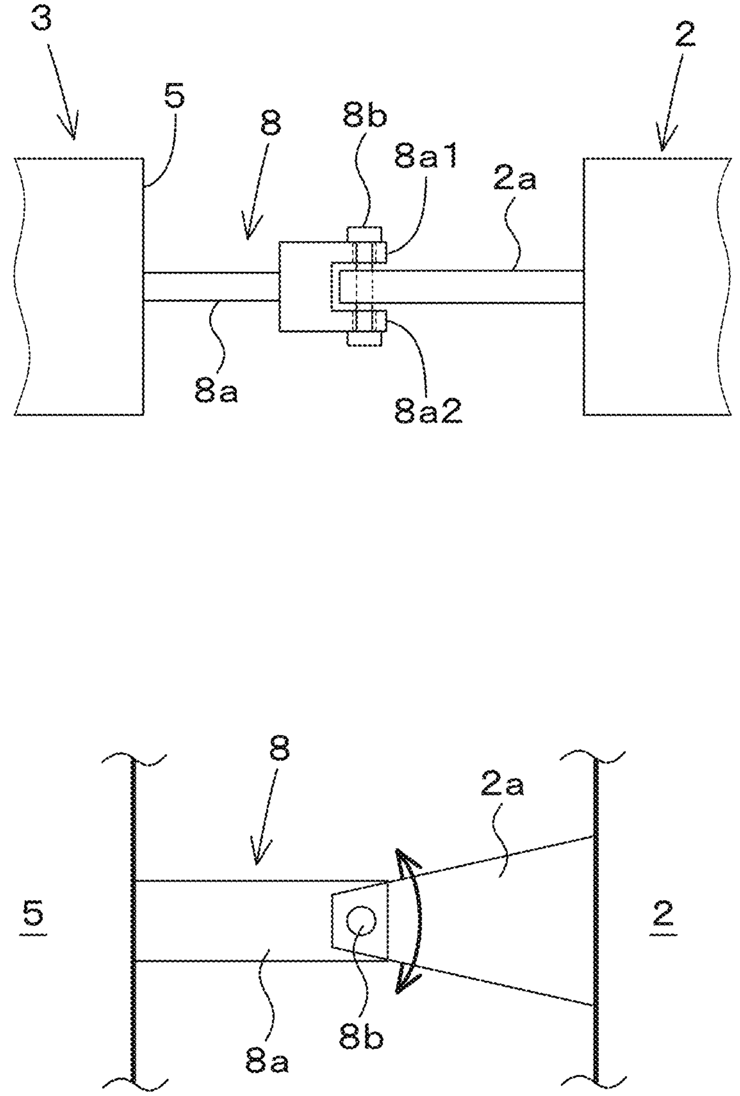
FIG. 2 is a view illustrating a coupler portion.

As shown in FIG. 2, the coupler portion 8 is, for example, a towing hitch and includes an extender body 8*a* extended rearwardly from the traveling machine body 3 and a pivoting pin 8*b* provided at the rear end portion of the extender body 8*a*. The front portion of the extender body 8*a* is fixed to the transmission case, differential case, and the like of the speed-shifter device 5 with bolts or other fasteners, and is not pivotable in the width direction.

The rear portion of the extender body 8*a* includes an upper wall 8*a*1 and a lower wall 8*a*2 separated from the upper wall 8*a*1, with a pivot pin 8*b* penetrating the upper wall 8*a*1 and the lower wall 8*a*2. By positioning the coupling bar 2*a* of the working device 2 between the upper wall 8*a*1 and the lower wall 8*a*2 and inserting the pivot pin 8*b* into the insertion hole in the coupling bar 2*a*, the working device 2 can be connected to the coupler portion 8.

Figure 3:
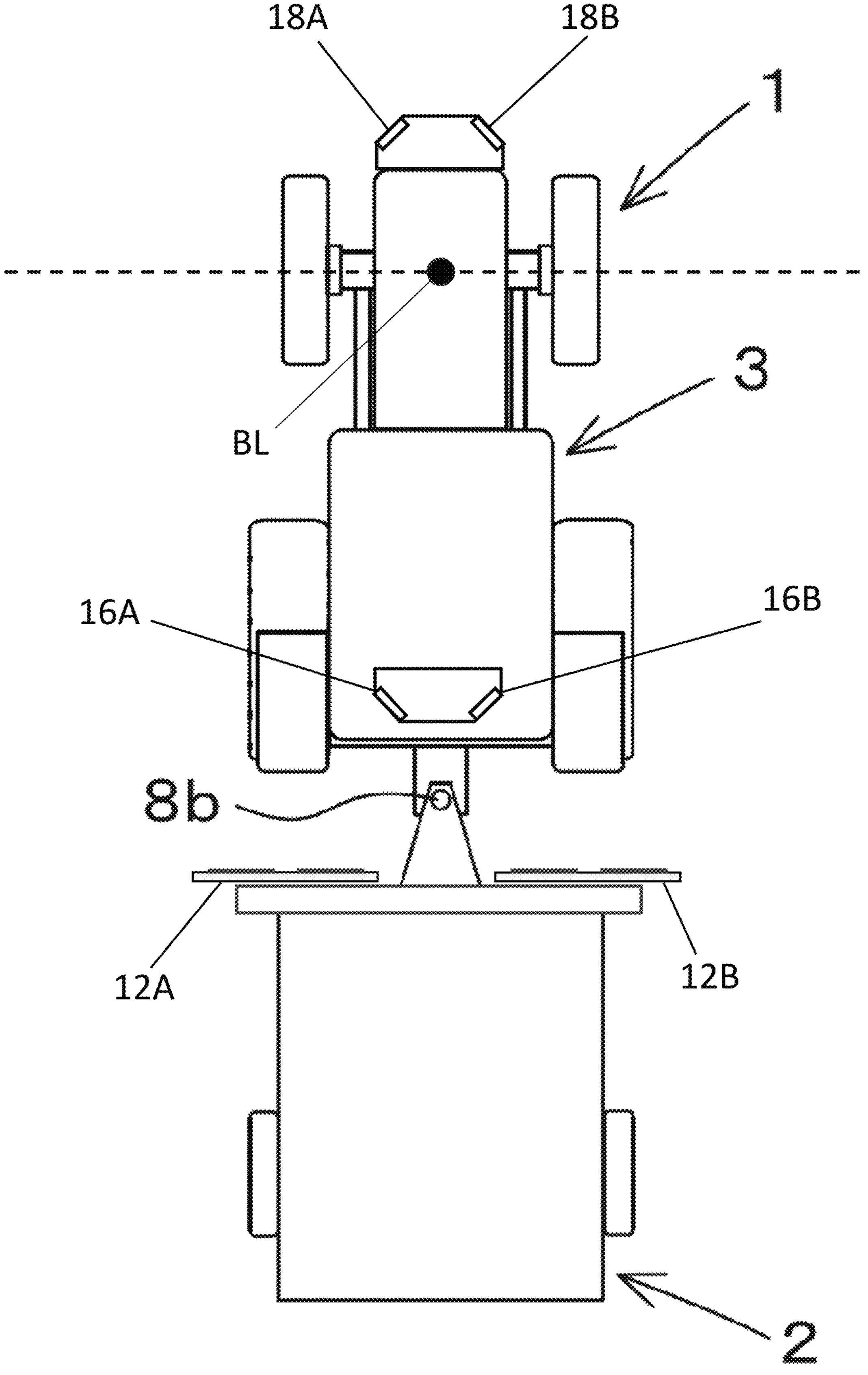
FIG. 3 is a plan view of a tractor.
Figure 4:
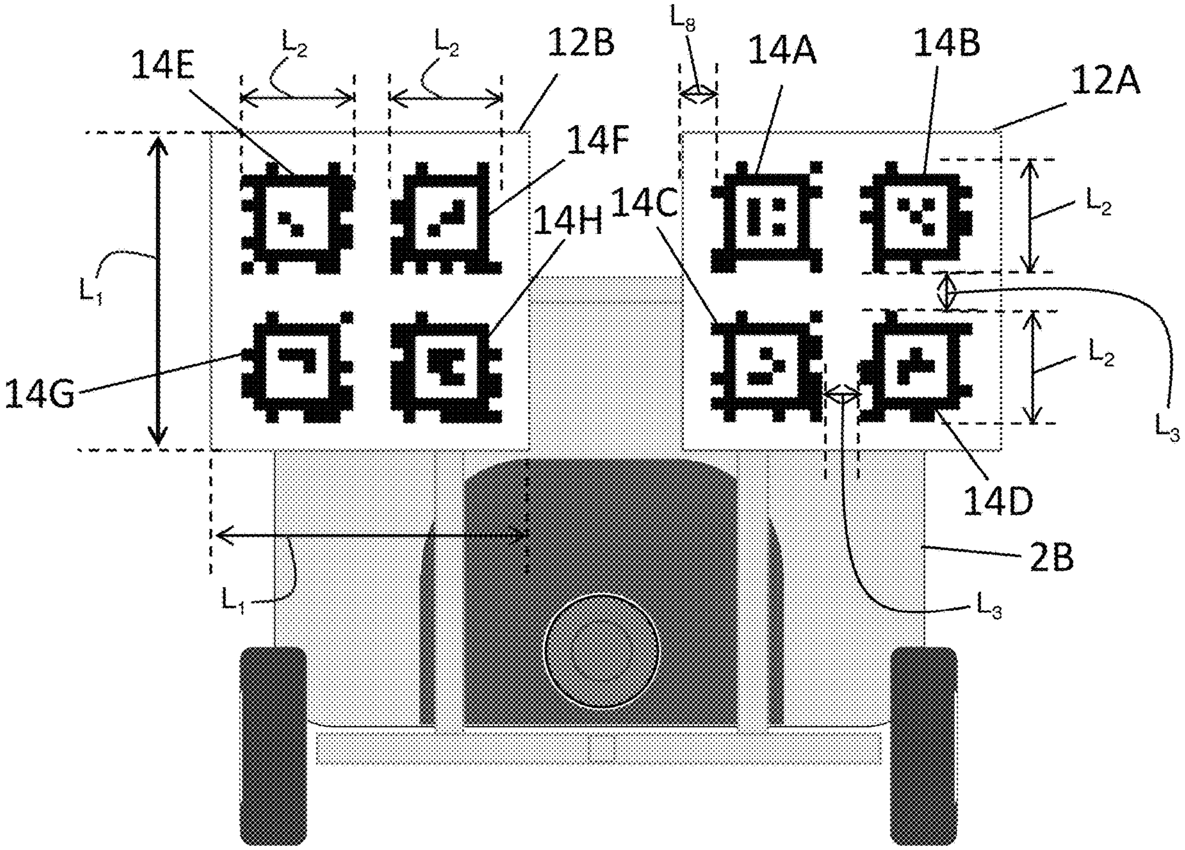
FIG. 4 shows a view of a working device connected to the rear portion of a traveling machine body from a rear side of the traveling machine body.

As shown in FIGS. 1A, 1B, 3, and 4, the working device 2 is provided with a plurality of marker bundles 12. For example, as shown in FIGS. 3 and 4, the working device 2 is provided with a first marker bundle 12A (e.g., a left side marker bundle) and a second marker bundle 12B (e.g., a right side marker bundle). FIG. 4 shows a view of the working device 2 connected to the rear portion of the traveling machine body 3 from the rear side of the traveling machine body 3.

In a preferred embodiment of the present invention, the first marker bundle 12A is attached to an upper left-hand corner of a frame 2*b* of the working device 2. The second marker bundle 12B is mounted in an upper right-hand corner of the frame 2*b* of the working device 2. The attachment positions of the plurality of marker bundles 12 are not limited.

In a preferred embodiment, each of the plurality of marker bundles 12 includes one or more markers 14. For example, as shown in FIG. 4, the first marker bundle 12A can include a first marker 14A, a second marker 14B, a third marker 14C, and a fourth marker 14D located side by side on a first marker bundle 12A. Similarly, as shown in FIG. 4, the second marker bundle 12B can include a fifth marker 14E, a sixth marker 14F, a seventh marker 14G, and an eighth marker 14H, located side by side on the second marker bundle 12 B, for example. Each of the markers 14A-14H are identifiable as different markers from each other. In a preferred embodiment, each of the markers 14A-14H can have a same length in a width direction and a same length in a vertical direction, as discussed in more detail below. As shown in FIG. 4, the first marker bundle 12A and the second marker bundle 12B are rectangular (square) with four sides.

As shown in FIGS. 1A, 1B, and 3, a first camera 16A (e.g., a left rear camera), a second camera 16B (e.g., a right rear camera), a third camera 18A (e.g., a left front camera), and a fourth camera 18B (e.g., a right front camera) can be attached to the tractor 1. In a preferred embodiment, the first camera 16A and the second camera 16B are provided at a rear portion of the tractor 1 to detect the plurality of marker bundles 12, as discussed in more detail below. For example, the first camera 16A and the second camera 16B can be attached to a rear frame of the tractor, to a portion of the cabin 9, or a rear fender of the tractor 1, however the attachment position of the first camera 16A and the second camera 16B is not limited thereto.

In a preferred embodiment, as shown in FIG. 3, for example, the first camera 16A faces a rearward and a first outward direction of the tractor 1 (e.g., a leftward direction), the second camera 16B faces a rearward and a second outward direction of the tractor 1 (e.g., a rightward direction), the third camera 18A faces a forward and a first outward direction of the tractor 1 (e.g., a leftward direction), and the fourth camera 18B faces a forward and a second outward direction of the tractor 1 (e.g., a rightward direction).

Figure 5:
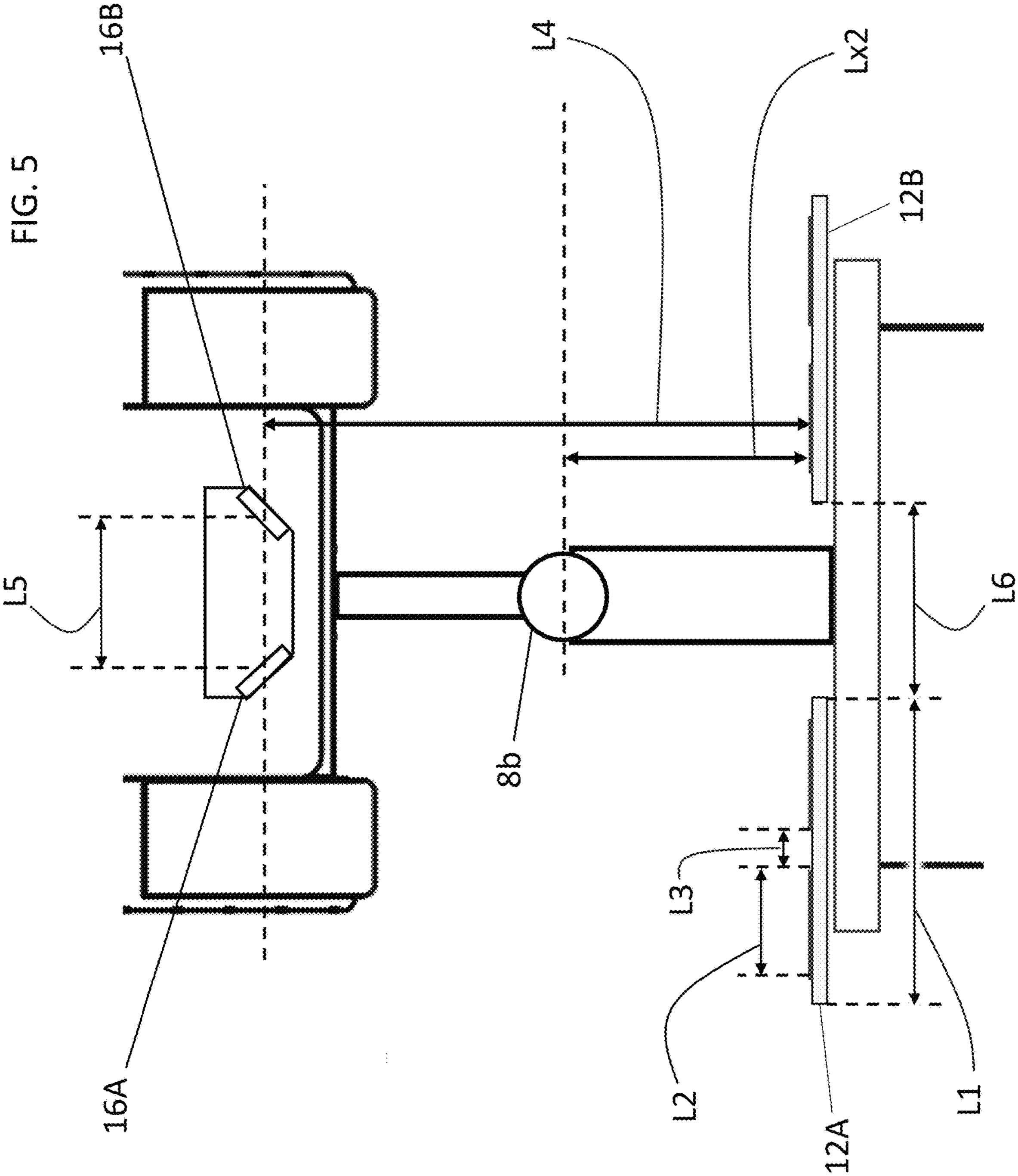
FIG. 5 is a plan view of a tractor.

Each of the first camera 16A, the second camera 16B, the third camera 18A, and the fourth camera 18B can includes a CCD camera, a CMOS camera, and an infrared camera, for example. In a preferred embodiment, each of the first camera 16A, the second camera 16B, the third camera 18A, and the fourth camera 18B can includes a stereo camera. In a preferred embodiment, the operating range/distance of the first camera 16A, the second camera 16B, the third camera 18A, and the fourth camera 18B can be about 40 m, however, this is non-limiting. For example, the operating range/distance of the first camera 16A, the second camera 16B, the third camera 18A, and the fourth camera 18B can be about 30 m to about 50 m. In a preferred embodiment, the operating range/distance of the first camera 16A, the second camera 16B, the third camera 18A, and the fourth camera 18B is greater than distance L4 shown in FIG. 5. As discussed in more detail below, as shown in FIG. 5, L4 designates a horizontal distance between a lens of the first camera 16A and the marker bundle 12A in a front-rear direction of the tractor 1, as well as a horizontal distance between a lens of the second camera 16B and the marker bundle 12B in a front-rear direction of the tractor 1.

As shown in FIGS. 1B and 3, for example, the tractor 1 includes a base link BL which is located at a center point of a front axis/axel in a left-right direction of the tractor 1.

As shown in FIG. 1B, h1 designates a vertical distance between the base link BL and a lens of the first camera 16A (e.g., an optical axis of the first camera 16A), as well as a vertical distance between the base link BL and a lens of the second camera 16B (e.g., an optical axis of the second camera 16B). The lens of the first camera 16A and the lens of the second camera 16B are mounted above the rear fenders in an up-down direction of the tractor 1. In a preferred embodiment, the h1 can be about 1.3 m, however this number is non-limiting. For example, h1 can be about 1 m to about 1.5 m, for example.

As shown in FIG. 1B, h2 designates a vertical distance between the base link BL and a center of the first marker bundle 12A, as well as a vertical distance between the base link BL and a center of the second marker bundle 12B. In a preferred embodiment, a center of the first marker bundle 12A and a center of the second marker bundle 12B are mounted below a lens of the first camera 16A and a lens of the second camera 16B in an up-down direction of the tractor. In a preferred embodiment, h2 is less than h1. In a preferred embodiment, the h2 can be about 1.0 m, however this number is non-limiting. For example, h2 can be about 0.8 m to about 1.1 m, for example, when the condition that h2 is shorter than h1 is satisfied.

As shown in FIG. 1B, h3 designates a vertical length of the first marker bundle 12A, as well as a vertical length of the second marker bundle 12B. In a preferred embodiment, the h3 can be about 0.5 m, however this number is non-limiting. For example, h3 can be about 0.3 m to about 0.7 m, for example.

As shown in FIG. 1B, h4 designates a vertical distance between the base link BL and a LiDAR 45 attached to the tractor 1. In a preferred embodiment, h4 can be about 0.5 m, however this number is non-limiting. For example, h4 can be about 0.3 m to about 0.7 m, for example. In a preferred embodiment, the LiDAR 45 is located above the third camera 18A and the fourth camera 18B in an up-down direction of the tractor 1, as shown in FIGS. 1A and 1B, for example.

As shown in FIG. 1B, Lx3 designates a horizontal distance between the base link BL and the LiDAR 45 in a front-rear direction of the tractor 1. In a preferred embodiment, Lx3 can be about 1.1 m, however this number is non-limiting. For example, Lx3 can be about the distance between the base link BL and a front surface of a front hood of the tractor 1, as shown in FIG. 1B, for example.

As shown in FIG. 1B, Lx1 designates a horizontal distance between the base link BL and the pivoting pin 8*b* in a front-rear direction of the tractor 1. In a preferred embodiment, Lx1 can be about 3.0 m, however this number is non-limiting. For example, Lx1 can be about 2.5 m to about 3.5 m, for example.

As shown in FIGS. 1B and 5, Lx2 designates a horizontal distance between the pivoting pin 8*b* and the first marker bundle 12A in a front-rear direction of the tractor 1, as well as a horizontal distance between the pivoting pin 8*b* and the second marker bundle 12B in a front-rear direction of the tractor 1. In a preferred embodiment, Lx2 can be about 0.8 m, however this number is non-limiting. For example, Lx2 can be about 0.6 m to about 1.0 m, for example.

As shown in FIGS. 4 and 5, for example, L1 designates a length of the first marker bundle 12A in a left-right direction of the tractor 1, as well as a length of the second marker bundle 12B in a left-right direction of the tractor 1. In a preferred embodiment, L1 can be about 0.5 m, however this number is non-limiting. For example, L1 can be about 0.3 m to about 0.7 m, for example.

As shown in FIGS. 4 and 5, for example, L2 designates a length of each of the markers 14 in a left-right direction of the tractor 1. In a preferred embodiment, L2 can be about 0.18 m, however this number is non-limiting. For example, L2 can be about 0.1 m to about 0.26 m, for example.

As shown in FIGS. 4 and 5, for example, L3 designates a distance between a first marker 14 and a second marker 14 of a same marker bundle. For example, in FIG. 4, L3 designates a distance between the third marker 14C and the fourth marker 14D of the first marker bundle 12A. In a preferred embodiment, L3 can be about 0.06 m, however this number is non-limiting. For example, L3 can be about 0.04 m to about 0.08 m, for example. In a preferred embodiment, the distance between a first marker 14 and a second marker 14 of a same marker bundle (L3) can be less than a distance L8 between the markers and a side edge of the marker bundle, as shown in FIG. 4, for example.

As shown in FIG. 5, L4 designates a horizontal distance between a lens of the first camera 16A and the marker bundle 12A in a front-rear direction of the tractor 1, as well as a horizontal distance between a lens of the second camera 16B and the marker bundle 12B in a front-rear direction of the tractor 1. In a preferred embodiment, L4 can be about 1.8 m, however this number is non-limiting. For example, L4 can be about 1.4 m to about 2.2 m, for example.

As shown in FIG. 5, L5 designates a horizontal distance between a lens of the first camera 16A and a lens of the second camera 16B in a left-right direction of the tractor 1. In a preferred embodiment, L5 can be about 0.24 m, however this number is non-limiting. For example, L5 can be about 0.2 m to about 0.28 m, for example.

As shown in FIG. 5, L6 designates a horizontal distance between the first marker bundle 12A (e.g., an inner most edge of the first marker bundle 12A) and the second marker bundle 12B (e.g., an inner most edge of the second marker bundle 12B) in a left-right direction of the tractor 1. In a preferred embodiment, L6 can be about 0.22 m, however this number is non-limiting. For example, L6 can be about 0.18 m to about 0.26 m, for example.

Figure 6:
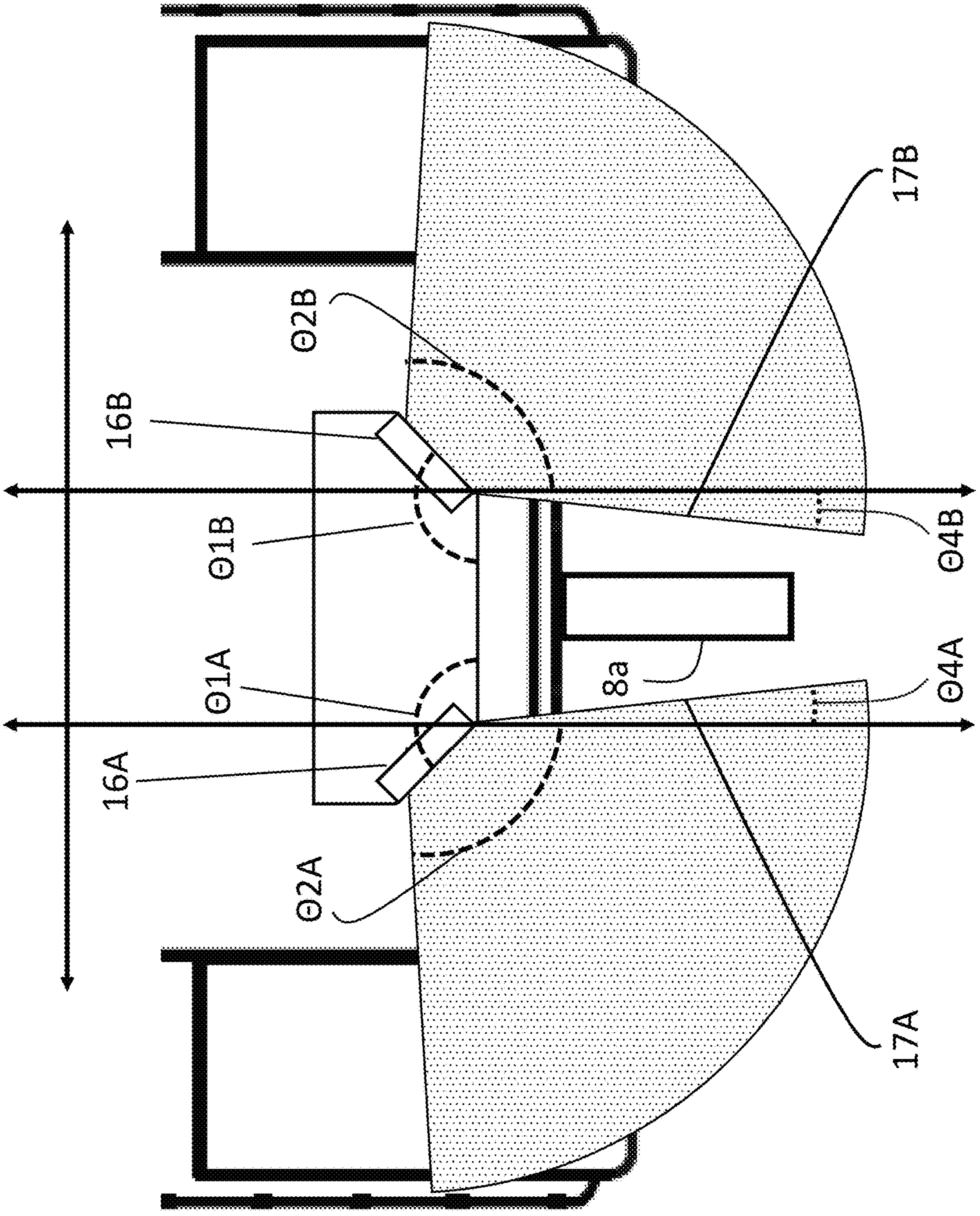
FIG. 6 is a plan view of a tractor.

As shown in FIG. 6, in a preferred embodiment, in a plan view, the first camera 16A is oriented with respect to the left-right direction of the tractor 1 at a camera mounting angle Θ1A. In a preferred embodiment, the camera mounting angle Θ1 is about 137 degrees, however this number is non-limiting. For example, the camera mounting angle Θ1 can be about 130 degrees to about 144 degrees. Similarly, as shown in FIG. 6, in a preferred embodiment, in a plan view, the second camera 16B is oriented with respect to the left-right direction of the tractor 1 at a camera mounting angle Θ1B. In a preferred embodiment, the camera mounting angle Θ1B is about 137 degrees, however this number is non-limiting. For example, the camera mounting angle Θ1B can be about 130 degrees to about 144 degrees. In a preferred embodiment, the camera mounting angle Θ1A of the first camera 16A is the same or substantially the same as the camera mounting angle Θ1B of the second camera 16B, however, this is non-limiting and the camera mounting angle Θ1A of the first camera 16A may be different from the camera mounting angle Θ1B of the second camera 16B.

As shown in FIG. 6, the first camera 16A has a first angle of view Θ2A. In a preferred embodiment, the first angle of view Θ2A is about 95 degrees, however this number is non-limiting. For example, the first angle of view Θ2A can be about 80 degrees to about 110 degrees. Similarly, as shown in FIG. 6, in a preferred embodiment, the second camera 16B has a second angle of view Θ2B. In a preferred embodiment, the second angle of view Θ2B is about 95 degrees, however this number is non-limiting. For example, the second angle of view Θ2B can be about 80 degrees to about 110 degrees. In a preferred embodiment, the first angle of view Θ2A of the first camera 16A is the same or substantially the same as the second angle of view Θ2B of the second camera 16B, however, this is non-limiting and the first angle of view Θ2A of the first camera 16A may be different from the second angle of view Θ2B of the second camera 16B.

As shown in FIG. 6, in a preferred embodiment, the first angle of view Θ2A includes a first inner edge 17A. In a preferred embodiment, the first inner edge 17A extends in an inward direction. For example, the first inner edge 17A is offset from a front-rear direction of the tractor 1. For example, as shown in FIG. 6, the first inner edge 17A is offset from the front-rear direction of the tractor 1 by a first offset angle Θ4A. In a preferred embodiment, the first offset angle Θ4A is about 4.5 degrees, however this number is non-limiting. For example, the first offset angle Θ4A can be about 3 degrees to about 6 degrees. Similarly, as shown in FIG. 6, in a preferred embodiment, the second angle of view Θ2B includes a second inner edge 17B. In a preferred embodiment, the second inner edge 17B extends in an inward direction. For example, the second inner edge 17B is offset from a front-rear direction of the tractor 1. For example, as shown in FIG. 6, the second inner edge 17B is offset from the front-rear direction of the tractor 1 by a second offset angle Θ4B. In a preferred embodiment, the second offset angle Θ4B is about 4.5 degrees, however this number is non-limiting. For example, the second offset angle Θ4B can be about 3 degrees to about 6 degrees. In a preferred embodiment, the first offset angle Θ4A is the same or substantially the same as the second offset angle Θ4B, however, this is non-limiting and the first offset angle Θ4A may be different from the second offset angle Θ4B.

As shown in FIG. 1A, in a preferred embodiment, in a side view, the first camera 16A is offset/oriented with respect to the front-rear direction of the tractor 1 at a camera mounting angle/tilt angle Θ3A. In a preferred embodiment, the tilt angle Θ3A is about 3 degrees, however this number is non-limiting. For example, the tilt angle Θ3 can be about 1 degrees to about 5 degrees. Similarly, as shown in FIG. 1A, in a preferred embodiment, in a side view, the second camera 16B is offset/oriented with respect to the front-rear direction of the tractor 1 at a camera mounting angle/tilt angle Θ3B. In a preferred embodiment, the tilt angle Θ3B is about 3 degrees, however this number is non-limiting. For example, the tilt angle Θ3B can be about 1 degrees to about 5 degrees. In a preferred embodiment, the tilt angle Θ3A of the first camera 16A is the same or substantially the same as the tilt angle Θ3B of the second camera 16B, however, this is non-limiting and the tilt angle Θ3A of the first camera 16A may be different from the tilt angle Θ3B of the second camera 16B.

Figure 7:
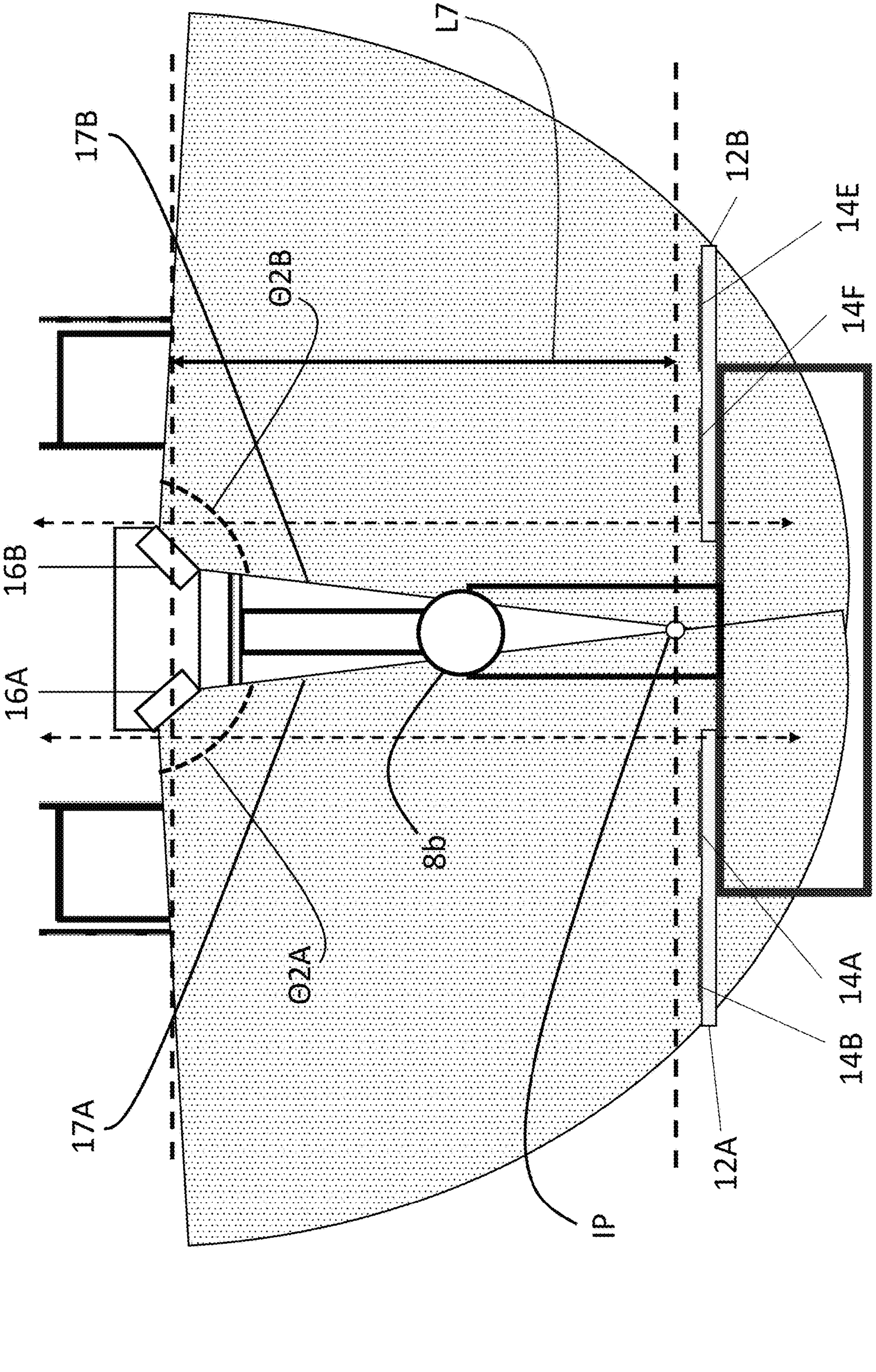
FIG. 7 is a plan view of a tractor.

In a preferred embodiment of the present invention, as shown in FIG. 7, for example, a leftmost portion of the first camera 16A is located inside of each of the markers 14 included on the first marker bundle 12. For example, a leftmost portion of the first camera 16A is located inside of a rightmost portion of the first marker 14A included on the first marker bundle 12. In other words, an innermost portion of the first marker 14A is located outside of the first camera 16A in a left-right direction of the tractor 1 when the working device 2 has a straight posture with respect to the traveling body 3.

Similarly, a rightmost portion of the second camera 16B is located inside of each of the markers 14 included on the second marker bundle 12B. For example, a rightmost portion of the second camera 16B is located inside of a leftmost portion of the sixth marker 14F included on the second marker bundle 12. In other words, an innermost portion of the marker 14F is located outside of the second camera 16B in the left-right direction of the tractor 1 when the working device 2 has the straight posture with respect to the traveling body 3.

As shown in FIG. 7, the first inner edge 17A of the first angle of view Θ2A of the first camera 16A intersects the second inner edge 17B of the second angle of view Θ2B of the second camera 16B at an intersection point IP. In a preferred embodiment, as shown in FIG. 7, the intersection point IP is located forward of the first marker bundle 12A and the second marker bundle 12B in a front-rear direction of the tractor 1 when the working device 2 has a straight posture with respect to the traveling body 3. In a preferred embodiment, as shown in FIG. 7, the intersection point IP is located rearward of the pivoting pin 8*b* in a front-rear direction of the tractor 1 when the working device 2 has a straight posture with respect to the traveling body 3.

As shown in FIG. 7, L7 designates a horizontal distance between the intersection point IP and a lens of the first camera 16A and a lens of the second camera 16B in a front-rear direction of the tractor 1. In a preferred embodiment, the L7 can be about 1.56 m, however this number is non-limiting. For example, L7 can be about 1.3 m to about 1.82 m, for example, when the condition that L7 is shorter than L4 is satisfied.

FIG. 7 shows an example when the working device 2 has a straight posture with respect to the traveling body 3 such that each of the markers 14A-14D included on the first marker bundle 12A is located within the first angle of view Θ2A of the first camera 16A, and each of the markers 14E-14H included on the second marker bundle 12B is located within the second angle of view Θ2B of the second camera 16B. As shown in FIG. 7, in a preferred embodiment, when the working device 2 has a straight posture with respect to the traveling body 3, the first markers 14A-D are located within the first angle of view Θ2A of the first camera 16A and are not located within the second angle of view Θ2B of the second camera 16B, and the second markers 14E-H are located within the second angle of view Θ2B of the second camera 16B and are not located within the first angle of view Θ2A of the first camera 16A.

Figure 9:
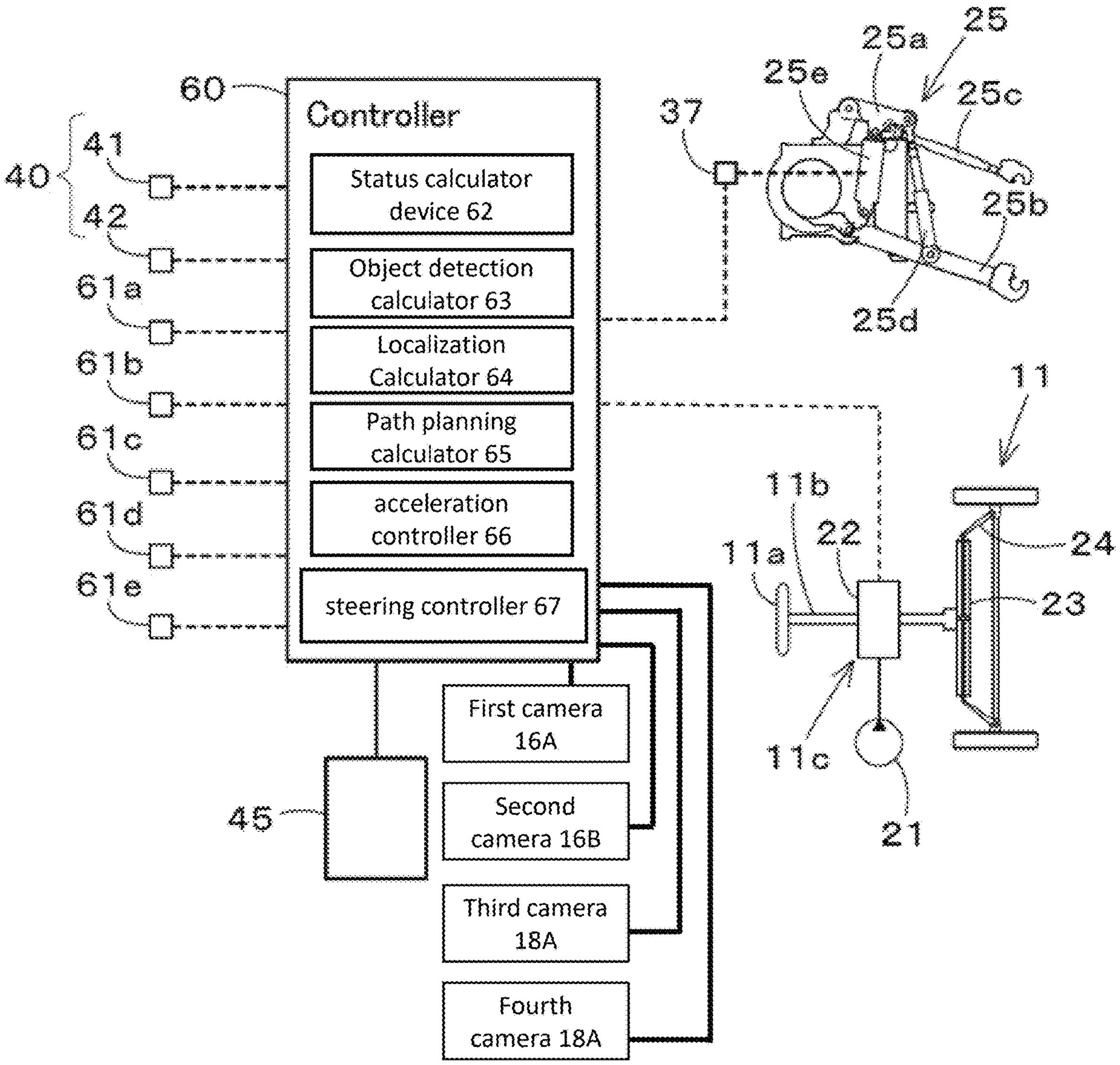
FIG. 9 is a control block diagram of a tractor.

As shown in FIG. 9, the tractor 1 is provided with a steering device 11. The steering device 11 includes a handle (steering wheel) 11*a*, a rotation shaft (steering shaft) 11*b* that rotates with the rotation of the handle 11*a*, and an assist mechanism (power steering mechanism) 11*c* that assists the steering of the handle 11*a*.

The assist mechanism 11*c* includes a hydraulic pump 21, a control valve 22 to which the hydraulic fluid discharged from the hydraulic pump 21 is supplied, and a steering cylinder 23 operated by the control valve 22. The control valve 22 is a solenoid valve that is activated based on a control signal.

The control valve 22 is a three-position switching valve that can be switched by movement of a spool or the like, for example. The control valve 22 can also be switched by steering the steering shaft 11B. The steering cylinder 23 is connected to an arm (knuckle arm) 24 that changes the direction of the front wheel 7F.

Thus, by operating the handle 11*a*, the switching position and opening of the control valve 22 is switched according to the handle 11*a*, and the steering direction of the front wheels 7F can be changed by stretching and shortening the steering cylinder 23 to the left or right according to the switching position and opening of the control valve 22. The steering device 11 described above is an example and is not limited to the configuration described above.

The tractor 1 can be provided with a positioning device 40. The positioning device 40 is configured to detect its own position (positioning information including latitude and longitude) by a satellite positioning system (positioning satellites) such as D-GPS, GPS, GLONASS, HOKUTO, GALILEO, MICHIBIKI, and the like.

That is, the positioning device 40 receives satellite signals transmitted from the positioning satellite (such as the position of the satellite, transmission time, correction information, and the like) and detects the position (for example, latitude and longitude) of the tractor 1, that is, the vehicle position, based on the satellite signals.

The positioning device 40 includes a receiver device 41 and an inertial measurement unit (IMU: Inertial Measurement Unit) 42. The receiver device 41 includes an antenna and other devices to receive satellite signals transmitted from a positioning satellite and is attached to the traveling vehicle body 3 separately from the inertial measurement unit 42.

In this preferred embodiment, the receiver device 41 is mounted on the traveling vehicle body 3, that is, the cabin 9. The attachment portion of the receiver device 41 is not limited to that of the present preferred embodiment.

The inertial measurement device 42 includes an acceleration sensor to detect acceleration, a gyroscope to detect angular velocity, and the like. The traveling vehicle body 3, for example, is installed below the operator seat 10, and the roll angle, pitch angle, yaw angle, and the like of the traveling vehicle body 3 can be detected by the inertial measurement device 42.

In the above-mentioned preferred embodiment, the coupler portion 8 includes a swing drawbar, but it may also include a lifter device, as shown in FIG. 9, for example. The case in which the coupler portion 8 includes a lifter device will be described. The coupler portion 8 includes a lift arm 25*a*, a lower link 25*b*, a top link 25*c*, a lift rod 25*d*, and a lift cylinder 25*e*.

The front end portion of the lift arm 25*a* is pivotally supported upward or downwardly on the upper rear portion of the case (transmission case) housing the speed-shifter device 5. The lift arm 25*a* is pivoted (lifted or lowered) by the driving of the lift cylinder 25*e*.

The lift cylinder 25*e* includes a hydraulic cylinder. The lift cylinder 25*e* is connected to a hydraulic pump via a control valve 37. The control valve 37 is a solenoid valve or the like, which stretches and shortens the lift cylinder 25*e*.

The front end portion of the lower link 25*b* is pivotally supported upwardly or downwardly on the rear bottom of the speed-shifter device 5. The front end portion of the top link 25*c* is pivotally supported upwardly or downwardly on the rear portion of the speed-shifter device 5 above the lower link 25*b*.

A lift rod 25*d* connects the lift arm 25*a* to the lower link 25*b*. A working device 2 is connected to the rear portion of the lower link 25*b* and the rear portion of the top link 25*c*.

When the lift cylinder 25*e* is driven (stretched), the lift arm 25*a* is lifted and lowered, as well as the lower link 25*b* connected to the lift arm 25*a* via the lift rod 25*d*.

This causes the working device 2 to pivot (lift or lower) upward or downward with the front of the lower link 25*b* as a fulcrum.

As shown in FIG. 9, the tractor is provided with a controller 60. The controller 60 can be configured or programmed to perform various controls of the tractor. The controller 60 moves the traveling machine body 3 forward and backward based on the operation of a forward/backward traveling member 61*a*.

The controller 60 starts and stops the prime mover 4 based on operation of the ignition switch 61*b*. The controller 60 changes the gear shift (gear shift level) of the speed-shifter device 5 based on operation of the speed-shifter switching material 61*c*. The controller 60 changes the speed of the prime mover 4 (prime mover speed) based on the operation of the gas pedal 61*d*. In this way, the controller 60 can be configured or programmed to define and function as an acceleration controller 66 as shown in FIG. 9, for example.

The controller 60, when the lifting operation member 61*e* is operated, stretches and shortens the lift cylinder 25*e* by controlling the control valve 37 to lift and lower the working device 2 via the lift arm 25*a*.

The controller 60 may control automatic traveling (automatic traveling control). In the automatic traveling in the controller 60, the traveling machine body 3 is automatically driven along a predetermined traveling route.

The controller 60 sets the switching position and opening of the control valve 22 so that at least the vehicle position of the traveling machine body 3 (the position detected by the positioning device 40) and the predetermined traveling route (the traveling route) match each other, that is, so that the traveling machine body 3 and the traveling route match each other.

In other words, when in the automatic traveling mode, the controller 60 sets the direction and amount of movement of the steering cylinder 23 (steering direction and steering angle of the front wheels) so that the travel position of the tractor coincides with the traveling route. In this way, the controller 60 can be configured or programmed to define and function as a steering controller 67 as shown in FIG. 9, for example.

In detail, in the automatic traveling mode, the controller 60 compares the traveling position of the traveling vehicle body 3 with the position indicated by the traveling route (the scheduled traveling position), and when the traveling position and the scheduled traveling position are consistent each other, the steering angle and direction of the steering wheel 11*a* (the steering angle and direction of the front wheels) at the steering device 11 are held unchanged (the opening of the control valve 22 and the switching position of the control valve 22 are maintained unchanged).

The controller 60 changes the steering angle and/or steering direction of the steering wheel 11*a* at the steering device 11 (changing the opening and/or switching position of the control valve 22) so that the deviation (amount of deviation) between the traveling position and the scheduled traveling position is zero when the traveling position and the scheduled traveling position do not match each other.

In the above-described preferred embodiment, the controller 60 changes the steering angle of the steering device 11 based on the deviation between the traveling position and the scheduled traveling position in the automatic traveling control, but when the orientation of the traveling route and the orientation (body orientation) of the traveling direction (driving direction) of the tractor (the traveling vehicle body 3) are different, the controller 60 may set the steering angle so that the body orientation matches the orientation of the traveling route.

The controller 60 may also set the final steering angle in automatic traveling control based on the steering angle obtained based on the deviation (position deviation) and the steering angle obtained based on the orientational deviation in automatic traveling control.

The steering angle may also be set in a different way than the method of setting the steering angle in the automatic traveling control described above.

The controller 60 may also control the number of revolutions of the traveling device 7 (that is, the front and/or rear wheels) so that the actual speed of the tractor (traveling machine body 3) matches the speed of the tractor (traveling machine body 3) corresponding to the predetermined traveling route in the automatic traveling control.

Although the controller 60 controls the steering of the traveling machine body 3 and the speed of the vehicle, the controller 60 performs the automatic traveling by controlling the steering of the traveling machine body 3, it is not limited to the automatic traveling control, although auto-steer control (the automatic steering control), which allows the driver to adjust the vehicle speed, may be performed. Also, as a matter of course, it is possible to perform the manual traveling in which the operator manually operates the tractor.

In another preferred embodiment of the present invention, the controller 60 can be configured or programmed to obtain object information from one or more of the first camera 16A, the second camera 16, the third camera 18A, the fourth camera 18B, and the LiDAR 45, as shown in FIG. 9, for example. In this way, the controller 60 can be configured or programmed to define and function as an object detection calculator 63 as shown in FIG. 9, for example.

In a preferred embodiment, the controller 60 can be configured or programmed to detect the position (for example, latitude and longitude) of the tractor 1, that is, the vehicle position, based on object information from one or more of the first camera 16A, the second camera 16, the third camera 18A, the fourth camera 18B, and the LiDAR 45. In this way, the controller 60 can be configured or programmed to define and function as a localization calculator 64 as shown in FIG. 9, for example.

In a preferred embodiment of the present invention, the controller 60 can be configured or programmed to function as a global planner and a local planner to generate the traveling route. The global planner generates an initial planned traveling route based on desired way points on an agricultural field, for example. An example of the global planner includes a Dijkstra global planner, known to one of ordinary skill in the art. The local planner will receive the initial planned traveling route generated by the global planner, and if an obstacle is on the initial planned traveling route, for example, if an obstacle is detected by the one or more of the first camera 16A, the second camera 16, the third camera 18A, the fourth camera 18B, and the LiDAR 45 as the tractor 1 travels in the agricultural field, then the local planner will change/update the initial planned traveling route so that the tractor 1 avoids the obstacle. For example, the local planner is able to use Time Elastic Bands (TEB), known to one of ordinary skill in the art, to create a sequence of intermediate working machine poses (x-coordinate, y-coordinate, and heading □) to modify the initial planned traveling route generated by the global planner. Thus, the controller 60 is configured or programmed to determine whether or not to update a planned traveling route of a working machine based an obstacle detected by the one or more of the first camera 16A, the second camera 16, the third camera 18A, the fourth camera 18B, and the LiDAR 45. In this way, the controller 60 can be configured or programmed to define and function as a path planning calculator 64 as shown in FIG. 9, for example.

As shown in FIG. 9, the tractor 1 can be provided with a status calculator device 62. The status calculator device 62 includes, for example, electrical and electronic circuits and programs provided in the controller 60. In other words, the controller 60 can be configured or programmed to define and function as the status calculator device 62. The status calculator device 62 is not limited to a program stored in a display device in the tractor 1 or in a mobile terminal of a smartphone, tablet or PDA.

The status calculator device 62 calculates the status of the working device 2 based on detection data detected by the first camera 16A and the second camera 16B, for example, a first image captured by the first camera 16A and a second image captured by the second camera 16B. For example, the status calculator device 62 determines the position and/or attitude (posture/orientation) of the working device 2 as the status of the working device 2.

In a preferred embodiment of the present invention, the status calculator device 62 is able to determine a position and attitude (posture/orientation) of the working device 2 by detecting at least one of the markers 14A-14H included on either of the first marker bundle 12A or the second marker bundle 12B. In a preferred embodiment, each of the markers 14A-14H included on the first marker bundle 12A and the second marker bundle 12B can include 9×9 cells, wherein each of the cells is 2 cm×2 cm. Each of the markers 14A-14H can define a two-dimensional bar code. For example, each of the markers 14A-14H can include an April Tag, known to a person of ordinary skill in the art.

In a preferred embodiment, the status calculator device 62 can be configured or programmed to compute the precise 3D position, orientation, and identity of each of the markers 14A-14H relative to the first camera 16A and the second camera 16B. For example, the status calculator device 62 can determine a position of the first markers 14A-14D of the first marker bundle 12A from a focal distance (subject distance) from the first camera 16A and/or the second camera 16B to the first markers 14A-14D, and can determine a position of the second markers 14E-14H of the second marker bundle 12B from a focal distance (subject distance) from the first camera 16A and/or the second camera 16B to the second markers 14E-14H of the second marker bundle 12B.

In a preferred embodiment, an error of the position and attitude estimation of the working device 2 can increase as an angle between a marker (e.g., markers 14A-14H) and a camera (e.g., the first camera 16A and the second camera 16B) increases. Thus, even though the status calculator device 62 is able to determine a position and attitude (posture/orientation) of the working device 2 based on only one of the markers 14A-14H included on either of the first marker bundle 12A or the second marker bundle 12B, preferred embodiments of the present invention enable the status calculator device 62 to determine a position and attitude (posture/orientation) of the working device 2 based on the position and orientation of more than one of the markers 14A-14H included on the first marker bundle 12A and the second marker bundle 12B. This enables preferred embodiments of the present invention to have improved robustness and reduce error of the position and attitude estimation of the working device 2.

In a preferred embodiment, the status calculator device 62 acquires a first image from the first camera 16A and a second image from the second camera 16B and detects the first markers 14A-14D of the first marker bundle 12A and/or the second markers 14E-14H of the second marker bundle 12B.

Figure 10A:
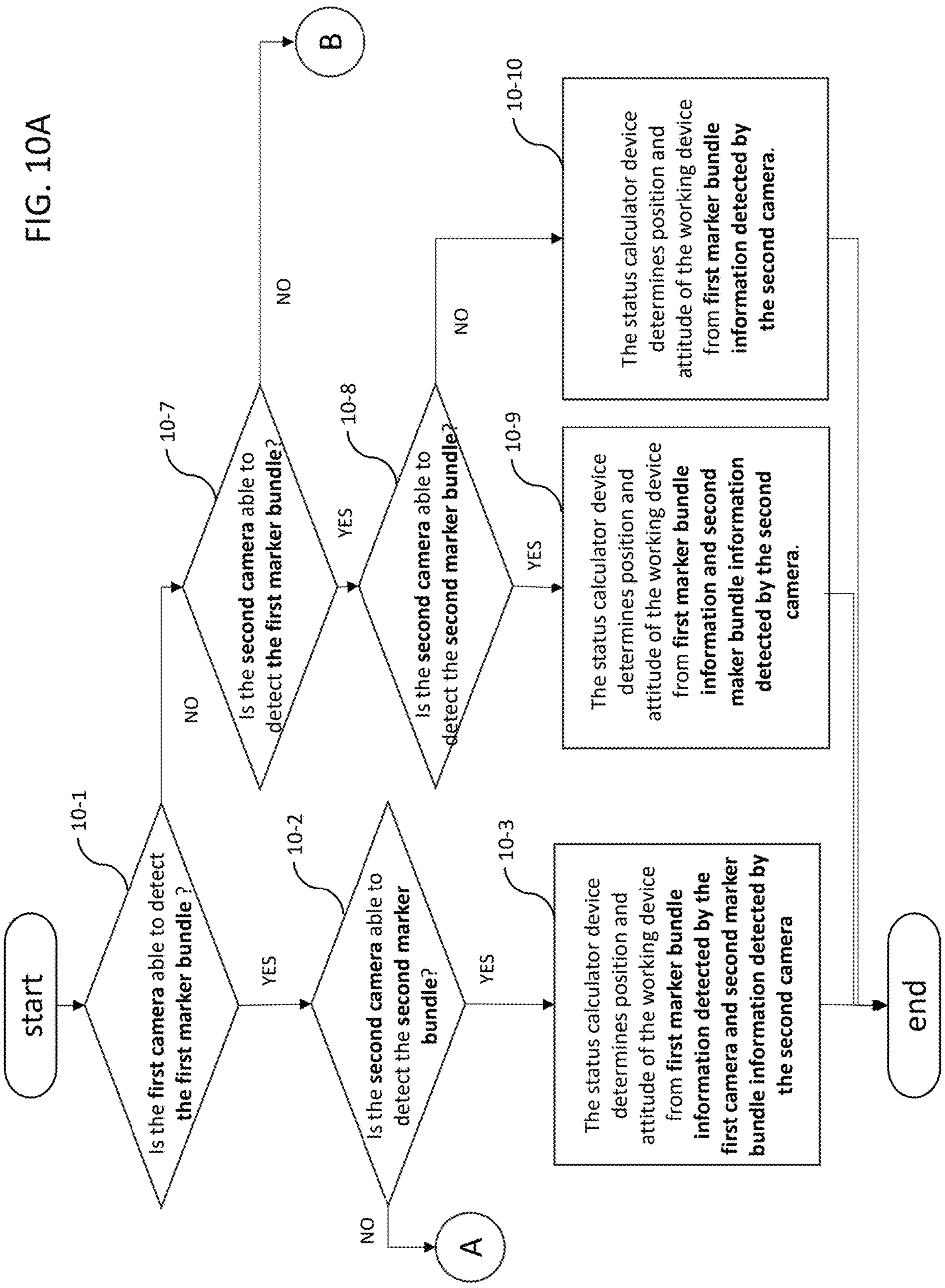
FIG. 10A-10C show a flow chart of a process according to a preferred embodiment of the present invention.
Figure 10B:
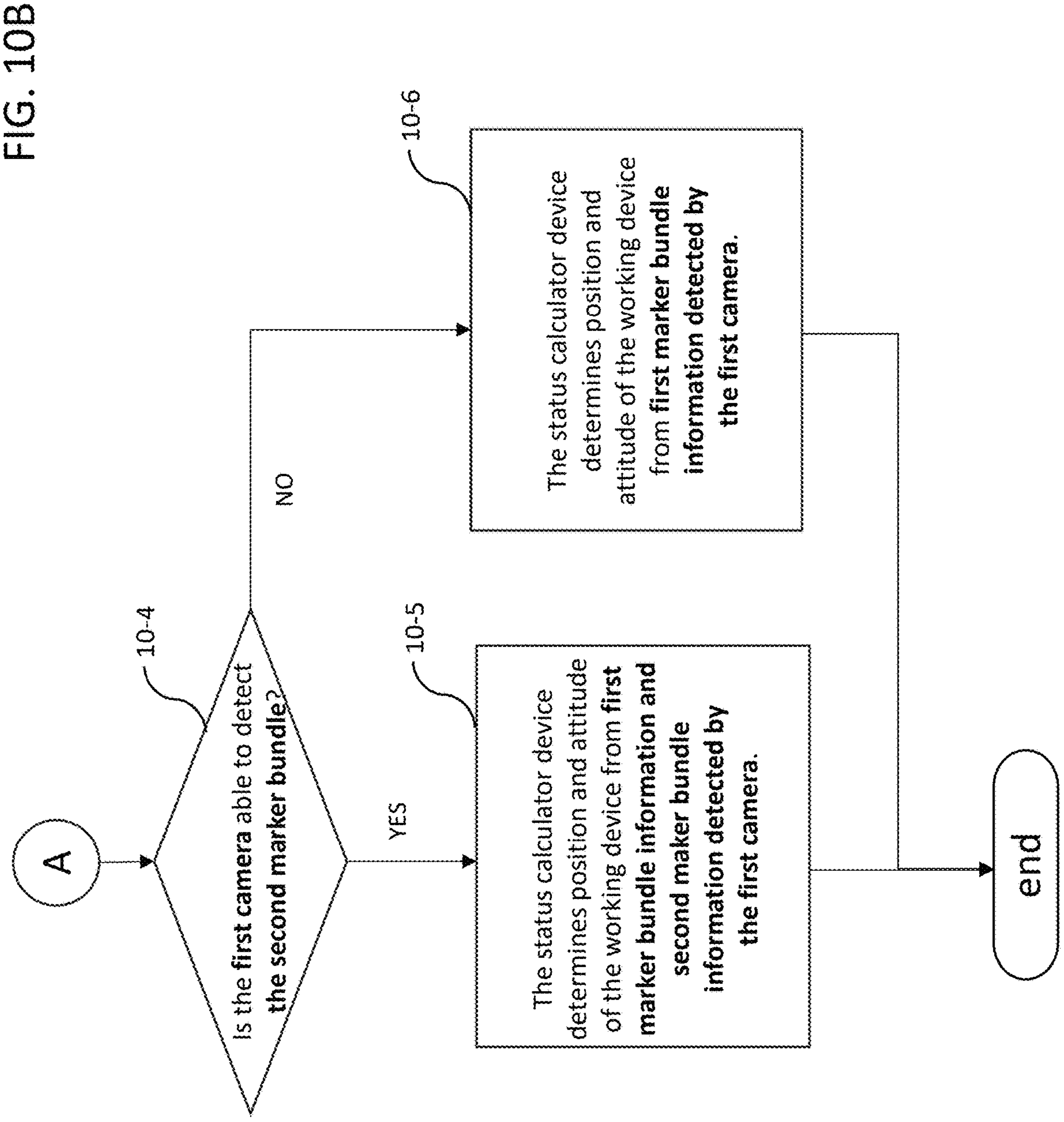
Figure 10C:
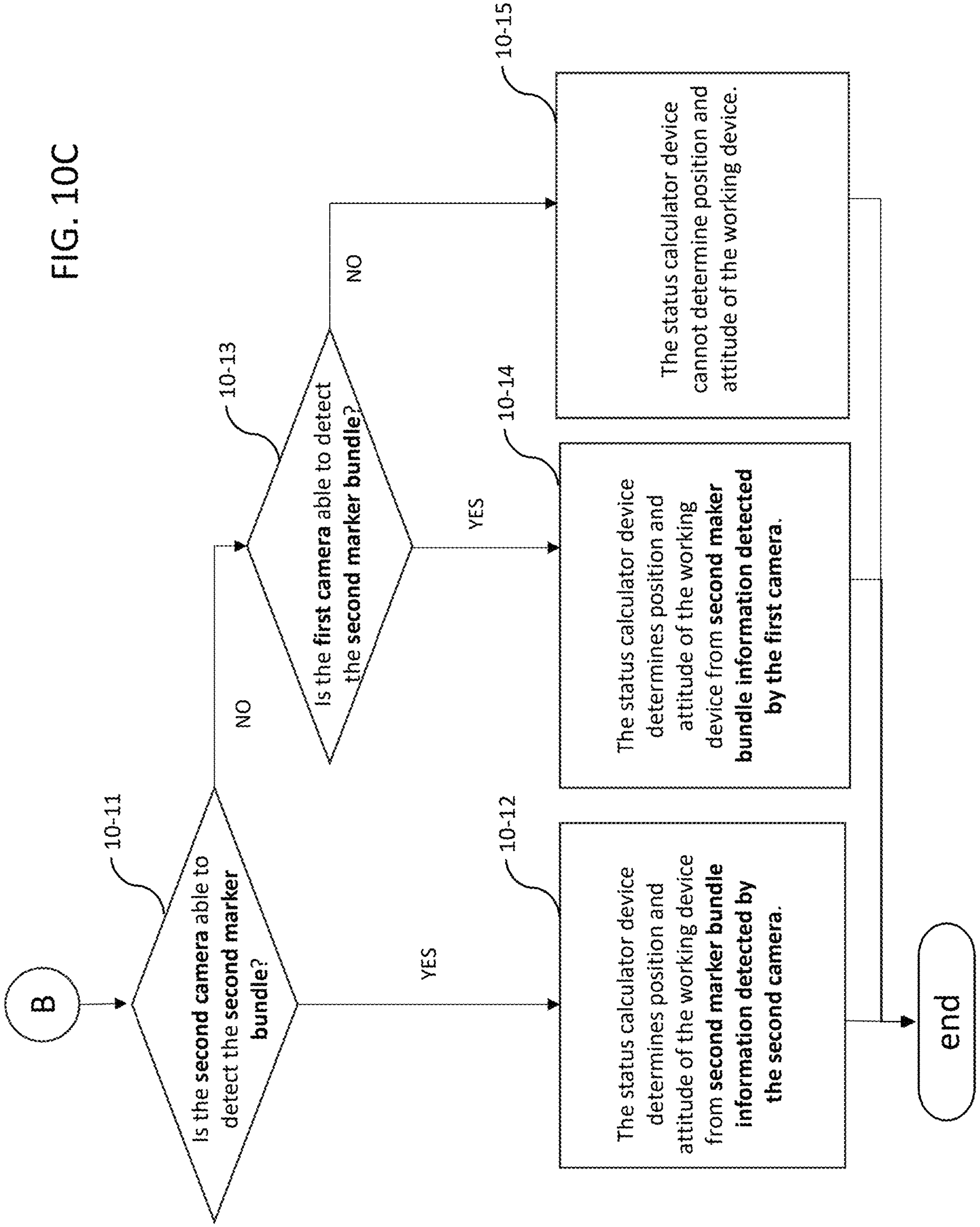

In a preferred embodiment, based on a first image captured by the first camera 16A and/or a second image captured by the second camera 16B, the status calculator device 62 determines a position and attitude/posture of the working device 2 based on first marker bundle information (e.g., information determined based on one or more of the first markers 14A-14D of the first marker bundle 12A) and/or second marker bundle information (e.g., information determined based on one or more of the second markers 14E-14H of the second marker bundle 12B), as discussed below with respect to FIGS. 10A-10C. FIGS. 10A-10C include a flowchart that shows an example of how the status calculator device 62 determines a position and attitude/posture of the working device 2 based on the first marker bundle information and/or the second marker bundle information.

Figure 8A:
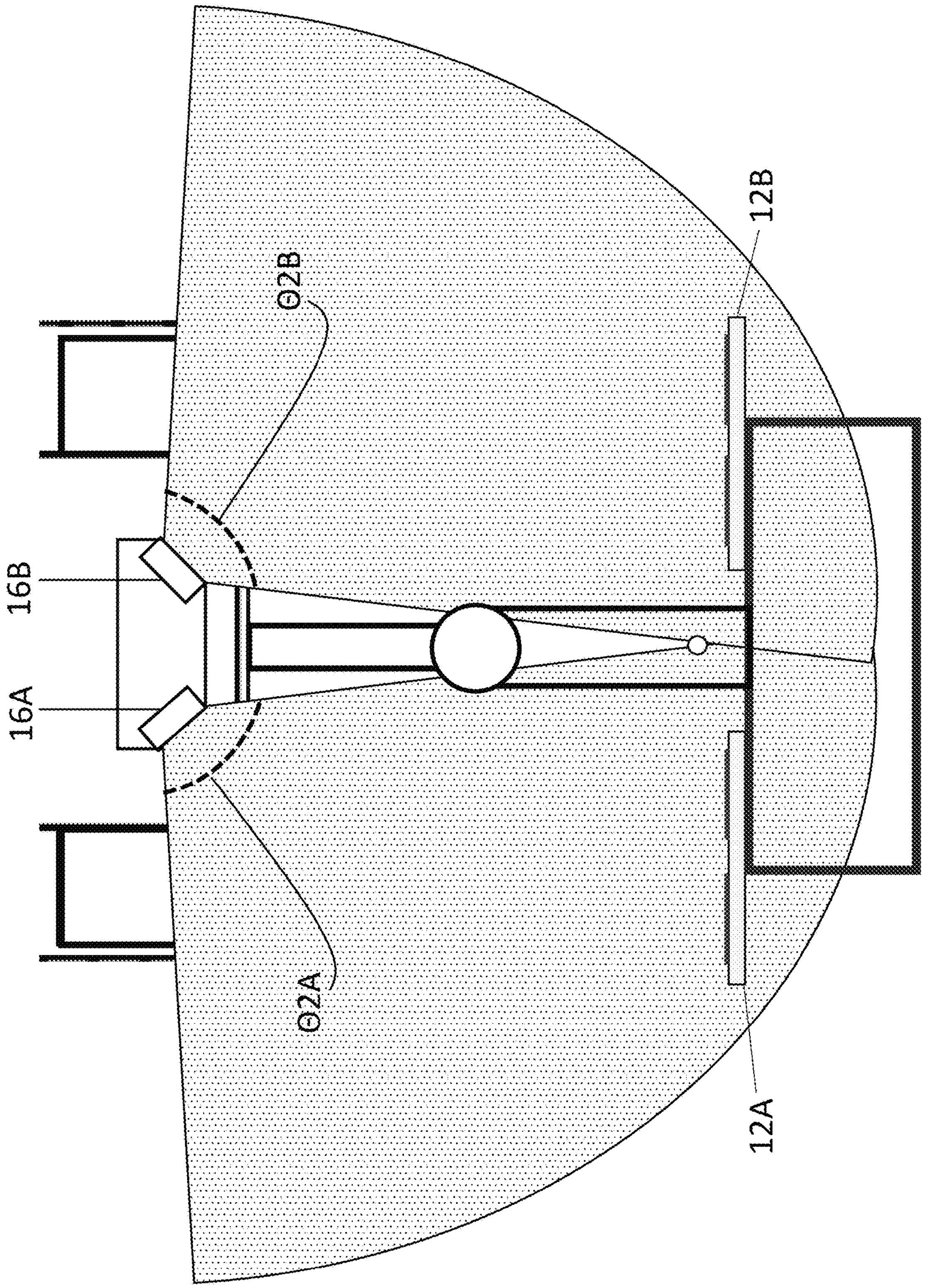
FIG. 8A is a plan view of a tractor.

In step 10-1, the status calculator device 62 determines whether or not the first camera 16A is able to detect the first marker bundle 12A (e.g., whether or not the first camera 16A is able to detect at least one of the markers 14A-14D included on the first marker bundle 12A). For example, the status calculator device 62 determines that the first camera 16A is able to detect the first marker bundle 12A when at least one of the markers 14A-14D included on the first marker bundle 12A is within the first angle of view Θ2A of the first camera 16A. FIG. 8A shows an example in which each of the markers 14A-14D included on the first marker bundle 12A is located within the first angle of view Θ2A of the first camera 16A. When the first camera 16A is able to detect the first marker bundle 12A (YES in step 10-1), the process proceeds to step 10-2.

In step 10-2, the status calculator device 62 determines whether or not the second camera 16B is able to detect the second marker bundle 12B (e.g., whether or not the second camera 16B is able to detect at least one of the markers 14E-14H included on the second marker bundle 12B). For example, the status calculator device 62 determines that the second camera 16B is able to detect the second marker bundle 12B when at least one of the markers 14E-14H included on the second marker bundle 12B is within the second angle of view Θ2B of the second camera 16B. FIG. 8A shows an example in which each of the markers 14E-14H included on the second marker bundle 12B is located within the second angle of view Θ2B of the second camera 16B. When the second camera 16B is able to detect the second marker bundle 12B in step 10-2 (YES in step 10-2), the process proceeds to step 10-3. In step 10-3, the status calculator device 62 determines a position and an attitude of the working device 2 based on first marker bundle information detected by the first camera 16A and second maker bundle information detected by the second camera 16B.

Figure 8B:
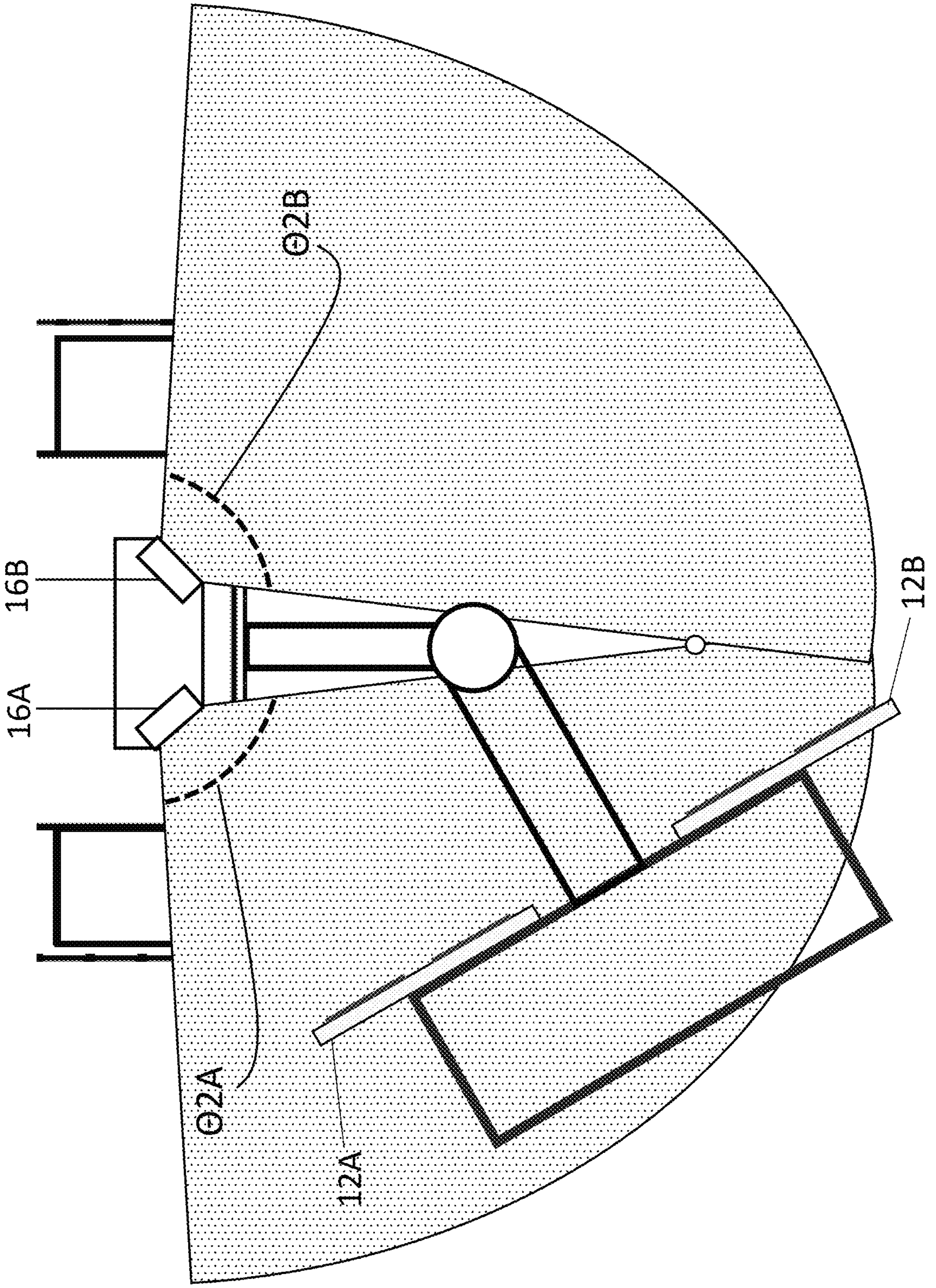
FIG. 8B is a plan view of a tractor.

When the second camera 16B is not able to detect the second marker bundle 12B in step 10-2 (NO in step 10-2), the process proceeds to step 10-4. In step 10-4, the status calculator device 62 determines whether or not the first camera 16A is able to detect the second marker bundle 12B (e.g., whether or not the first camera 16A is able to detect at least one of the markers 14E-14H included on the second marker bundle 12B). For example, the status calculator device 62 determines that the first camera 16A is able to detect the second marker bundle 12B when at least one of the markers 14E-14H included on the second marker bundle 12B is within the first angle of view Θ2A of the first camera 16A. When the first camera 16A is able to detect the second marker bundle 12B in step 10-4 (YES in step 10-4), the process proceeds to step 10-5. In step 10-5, the status calculator device 62 determines a position and an attitude of the working device 2 based on first marker bundle information and second maker bundle information detected by the first camera 16A. FIG. 8B shows an example in which the status calculator device 62 determines a position and an attitude of the working device 2 based on first marker bundle information and second maker bundle information detected by the first camera 16A.

Figure 8C:
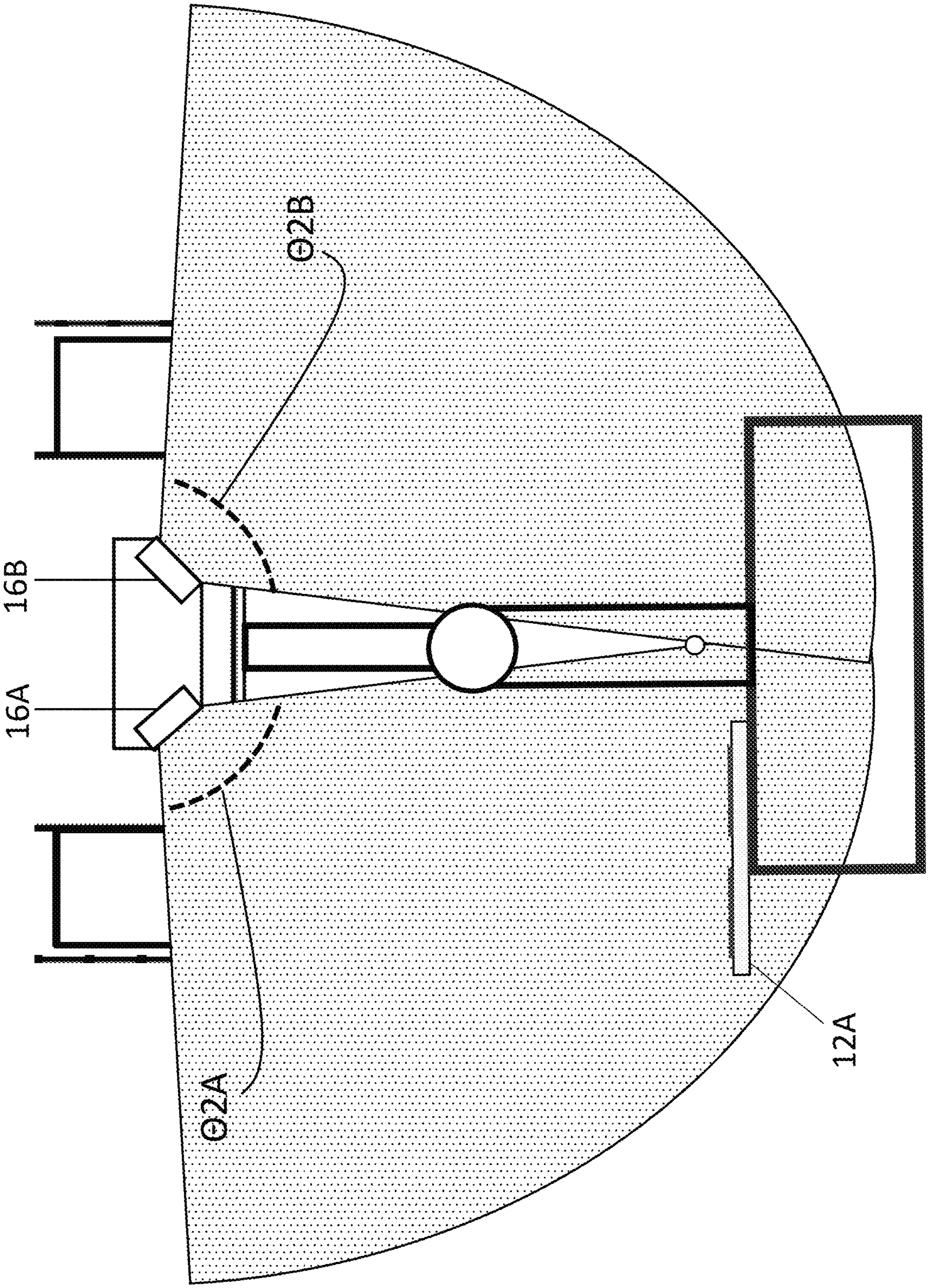
FIG. 8C is a plan view of a tractor.

When the first camera 16A is not able to detect the second marker bundle 12B in step 10-4 (NO in step 10-4), the process proceeds to step 10-6. In step 10-6, the status calculator device 62 determines a position and an attitude of the working device 2 based on first marker bundle information detected by the first camera 16A. FIG. 8C shows an example in which the status calculator device 62 determines a position and an attitude of the working device 2 based on first marker bundle information detected by the first camera 16A. FIG. 8C shows an example in which the second marker bundle 12B has fallen off the working device 2. However, this is not a limiting example. For instance, the status calculator device 62 can determine a position and an attitude of the working device 2 based on first marker bundle information detected by the first camera 16A when, for example, the second camera 16B has fallen off the tractor 1, the second camera 16B is not functioning, or each of the markers 14E-H of the second marker bundle 12B are obscured (e.g., by mud).

Figure 8D:
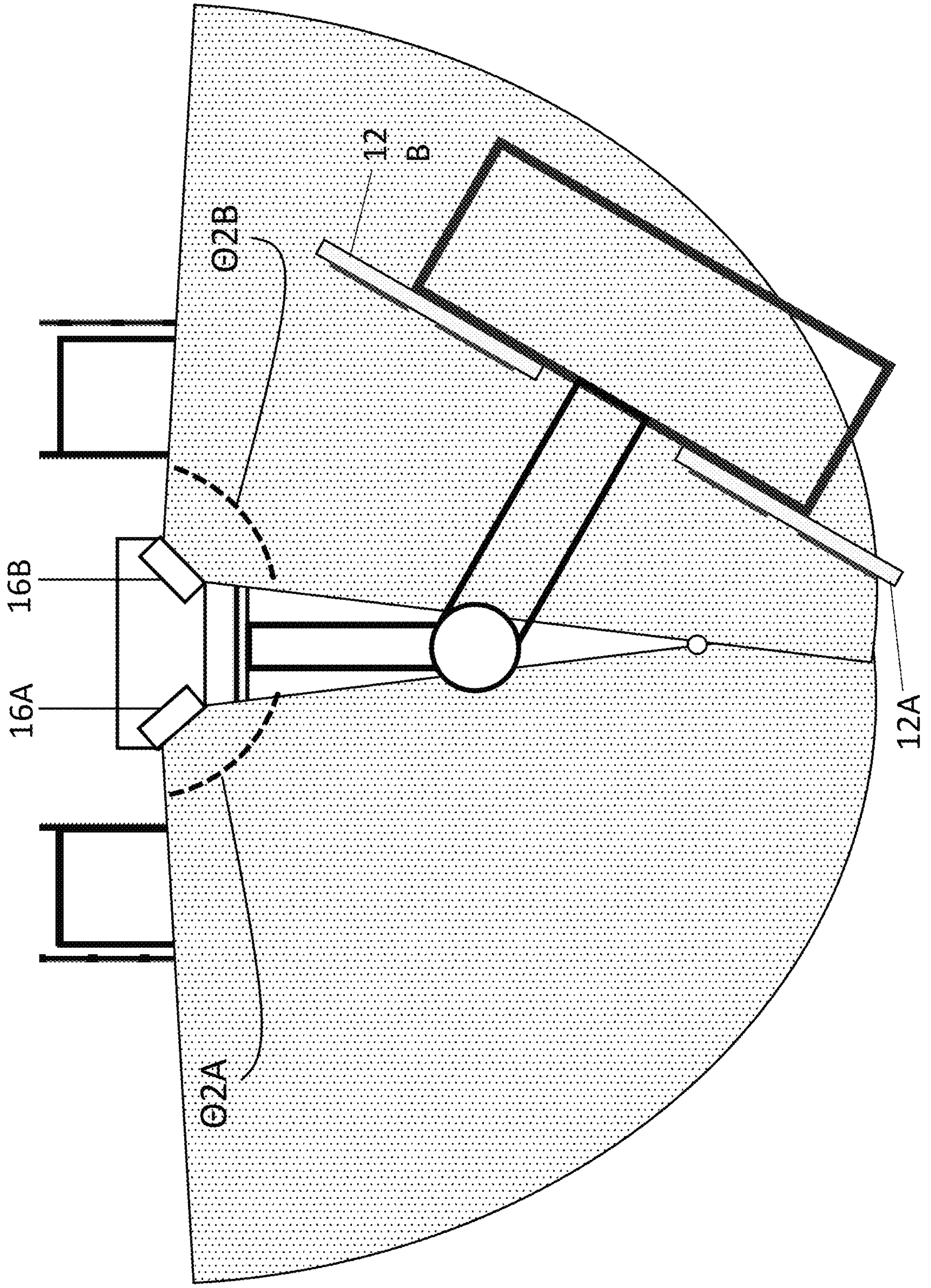
FIG. 8D is a plan view of a tractor.

Returning to step 10-1, when the first camera 16A is not able to detect the first marker bundle 12A in step 10-1 (NO in step 10-1), the process proceeds to step 10-7. In step 10-7, the status calculator device 62 determines whether or not the second camera 16B is able to detect the first marker bundle 12A (e.g., whether or not the second camera 16B is able to detect at least one of the markers 14A-14D included on the first marker bundle 12B). For example, the status calculator device 62 determines that the second camera 16B is able to detect the first marker bundle 12A when at least one of the markers 14A-14D included on the first marker bundle 12A is within the second angle of view Θ2B of the second camera 16B. FIG. 8D shows an example in which each of the markers 14A-14D included on the first marker bundle 12A is located within the second angle of view Θ2B of the second camera 16B. When the second camera 16B is able to detect the first marker bundle 12A in step 10-7 (YES in step 10-7), the process proceeds to step 10-8.

In step 10-8, the status calculator device 62 determines whether or not the second camera 16B is able to detect the second marker bundle 12B (e.g., whether or not the second camera 16B is able to detect at least one of the markers 14E-14H included on the second marker bundle 12B). For example, the status calculator device 62 determines that the second camera 16B is able to detect the second marker bundle 12B when at least one of the markers 14E-14H included on the second marker bundle 12B is within the second angle of view Θ2B of the second camera 16B. FIG. 8D shows an example in which each of the markers 14E-14H included on the second marker bundle 12B is located within the second angle of view Θ2B of the second camera 16B. When the second camera 16B is able to detect the second marker bundle 12B in step 10-8 (YES in step 10-8), the process proceeds to step 10-9. In step 10-9, the status calculator device 62 determines a position and an attitude of the working device 2 based on first marker bundle information and second maker bundle information detected by the second camera 16B. FIG. 8D shows an example in which the status calculator device 62 determines a position and an attitude of the working device 2 based on first marker bundle information and second maker bundle information detected by the second camera 16B.

Figure 8E:
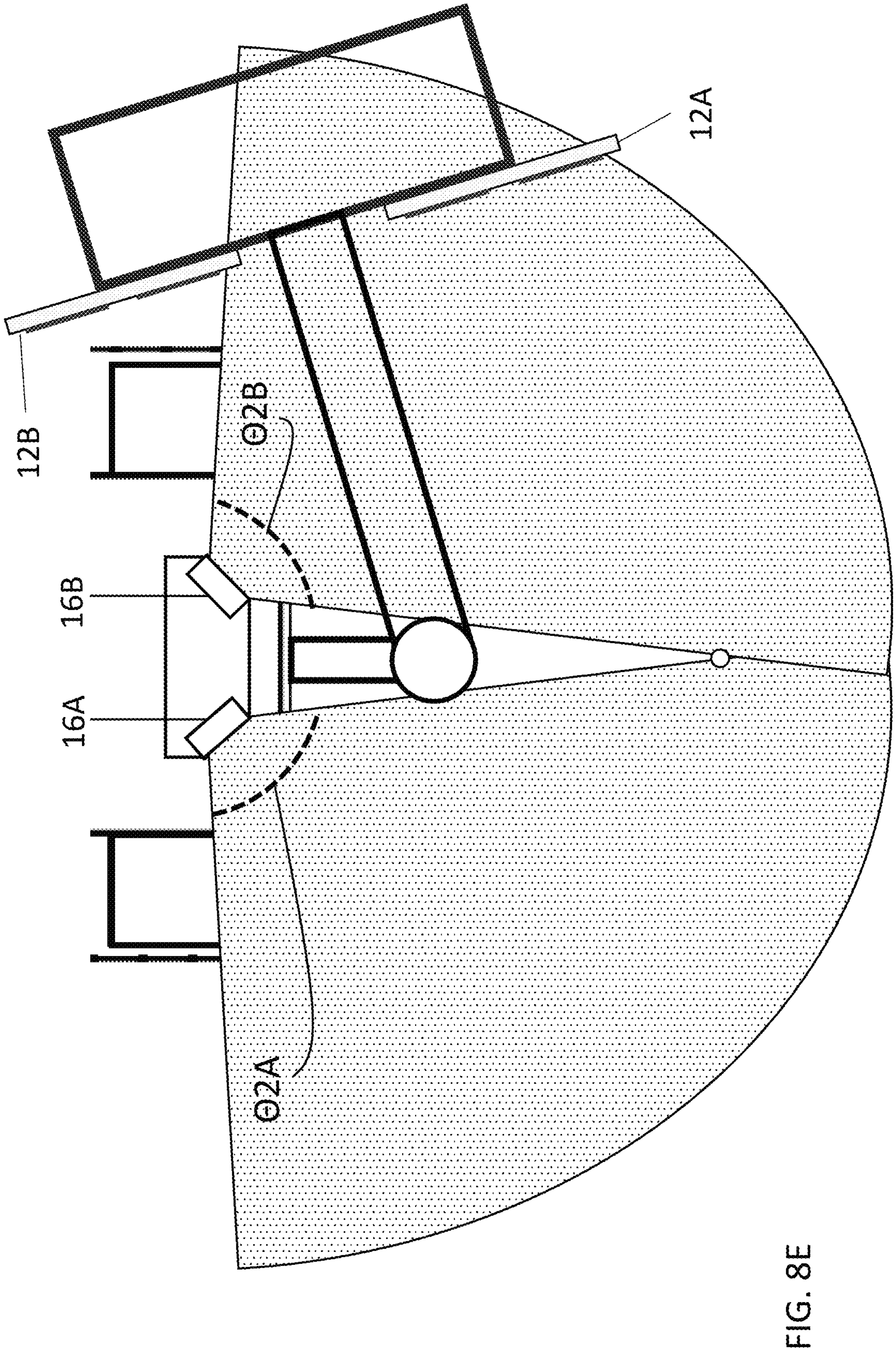
FIG. 8E is a plan view of a tractor.

When the second camera 16B is not able to detect the second marker bundle 12B in step 10-8 (NO in step 10-8), as shown in FIG. 8E for example, the process proceeds to step 10-10. In step 10-10, the status calculator device 62 determines a position and an attitude of the working device 2 based on first marker bundle information detected by the second camera 16B. FIG. 8E shows an example in which the status calculator device 62 determines a position and an attitude of the working device 2 based on first marker bundle information detected by the second camera 16B.

Figure 8F:
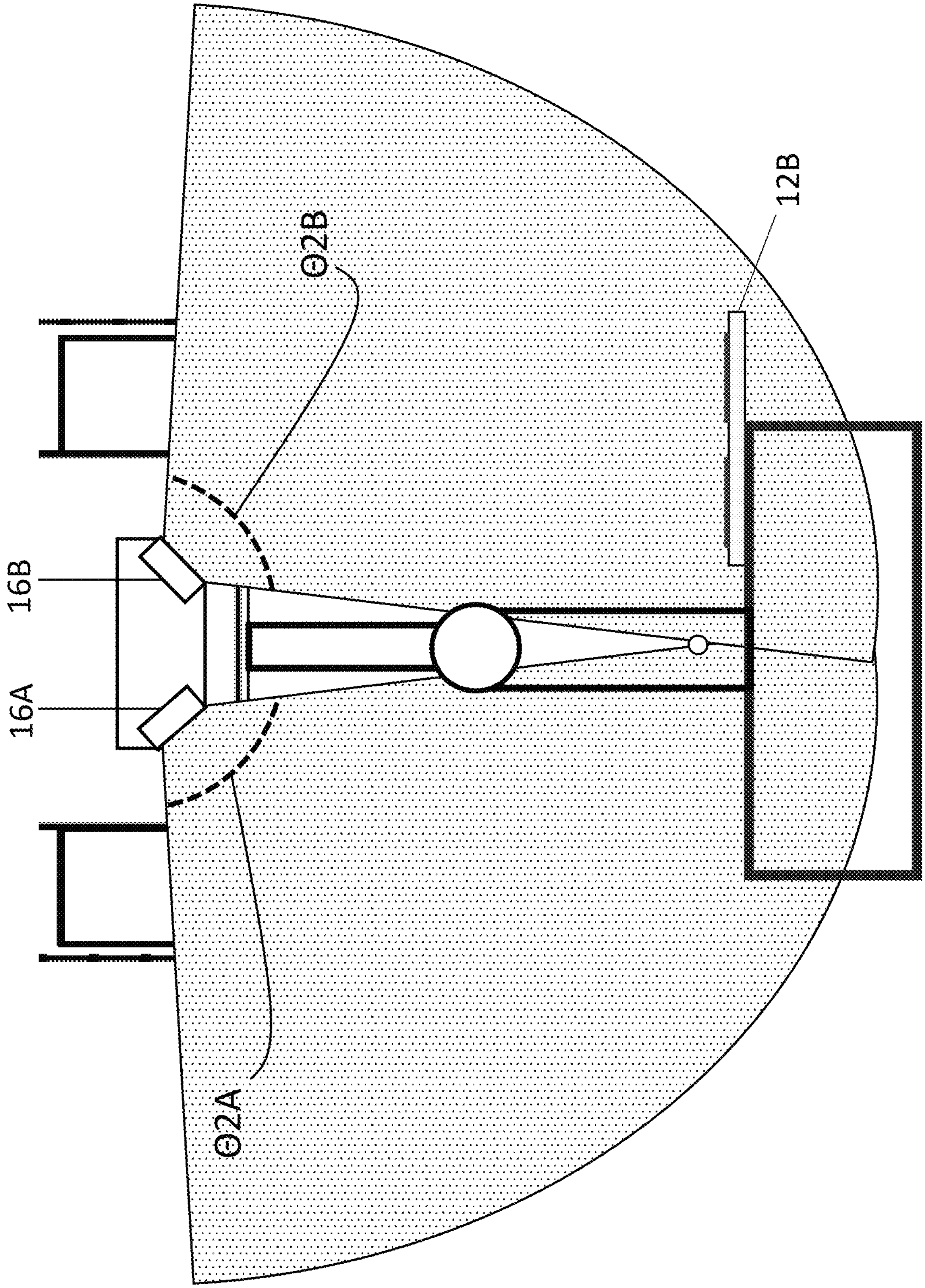
FIG. 8F is a plan view of a tractor.

Returning to step 10-7, when the second camera 16B is not able to detect the first marker bundle 12A in step 10-7 (NO in step 10-7), the process proceeds to step 10-11. When the second camera 16B is able to detect the second marker bundle 12B in step 10-11 (YES in step 10-11), the process proceeds to step 10-12. In step 10-12, the status calculator device 62 determines a position and an attitude of the working device 2 based on second maker bundle information detected by the second camera 16B. FIG. 8F shows an example in which the status calculator device 62 determines a position and an attitude of the working device 2 based on second maker bundle information detected by the second camera 16B. FIG. 8F shows an example in which the first marker bundle 12A has fallen off the working device 2. However, this is not a limiting example. For instance, the status calculator device 62 can determine a position and an attitude of the working device 2 based on second marker bundle information detected by the second camera 16B when, for example, the first camera 16A has fallen off the tractor 1, the first camera 16A is not functioning, or each of the markers 14A-D of the first marker bundle 12A are obscured (e.g., by mud).

Figure 8G:
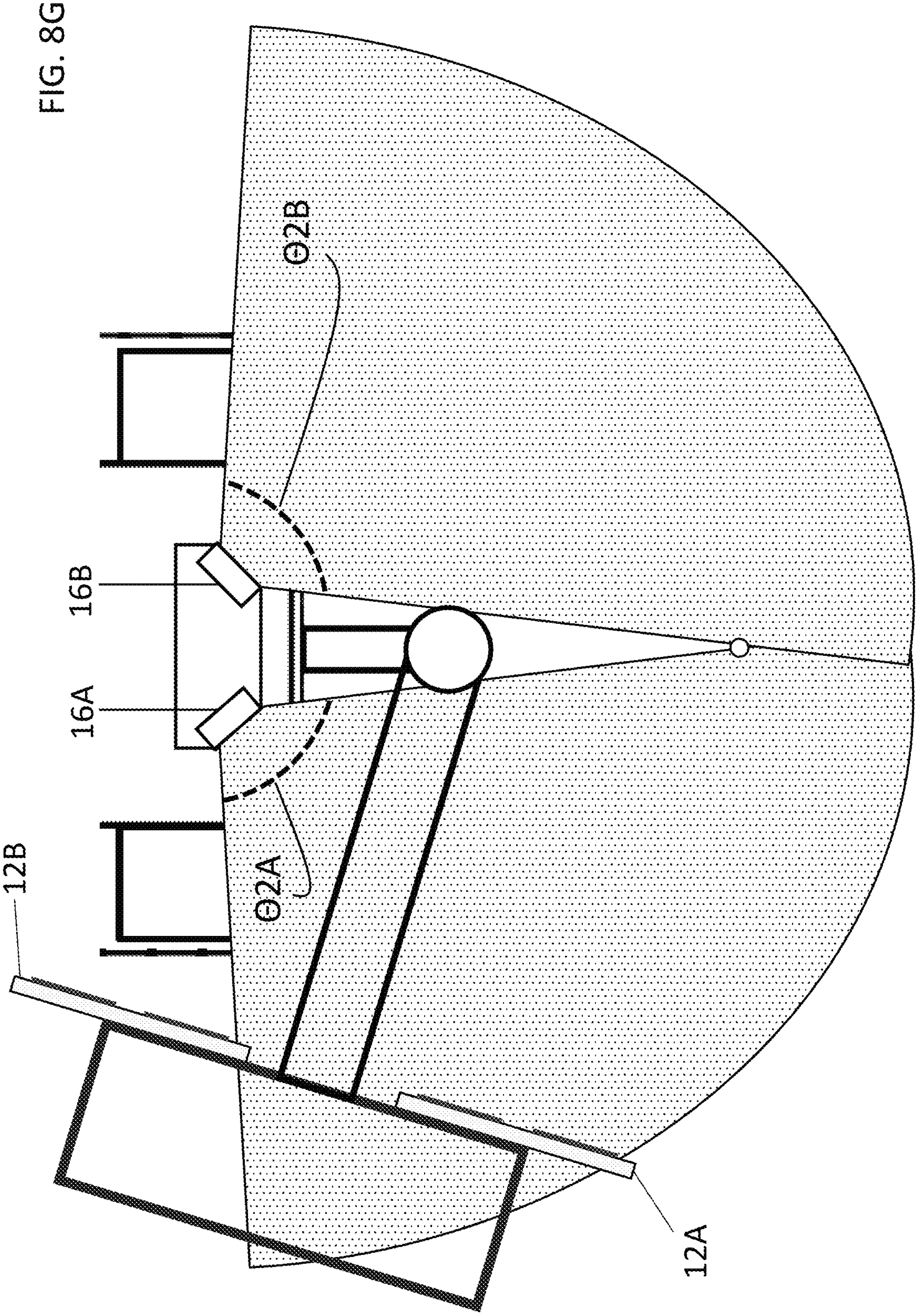
FIG. 8G is a plan view of a tractor.

When the second camera 16B is not able to detect the second marker bundle 12B in step 10-11 (NO in step 10-11), as shown in FIG. 8G for example, the process proceeds to step 10-13. When the first camera 16A is able to detect the second marker bundle 12B in step 10-13 (YES in step 10-13), the process proceeds to step 10-14. In step 10-14, the status calculator device 62 determines a position and an attitude of the working device 2 based on second marker bundle information detected by the first camera 16A. FIG. 8G shows an example in which the status calculator device 62 determines a position and an attitude of the working device 2 based on second marker bundle information detected by the first camera 16A.

When the first camera 16A is not able to detect the second marker bundle 12B in step 10-13 (NO in step 10-13), the process proceeds to step 10-15. In step 10-15, the status calculator device 62 determines that it is not possible to determine a position and an attitude of the working device 2.

Figure 8H:
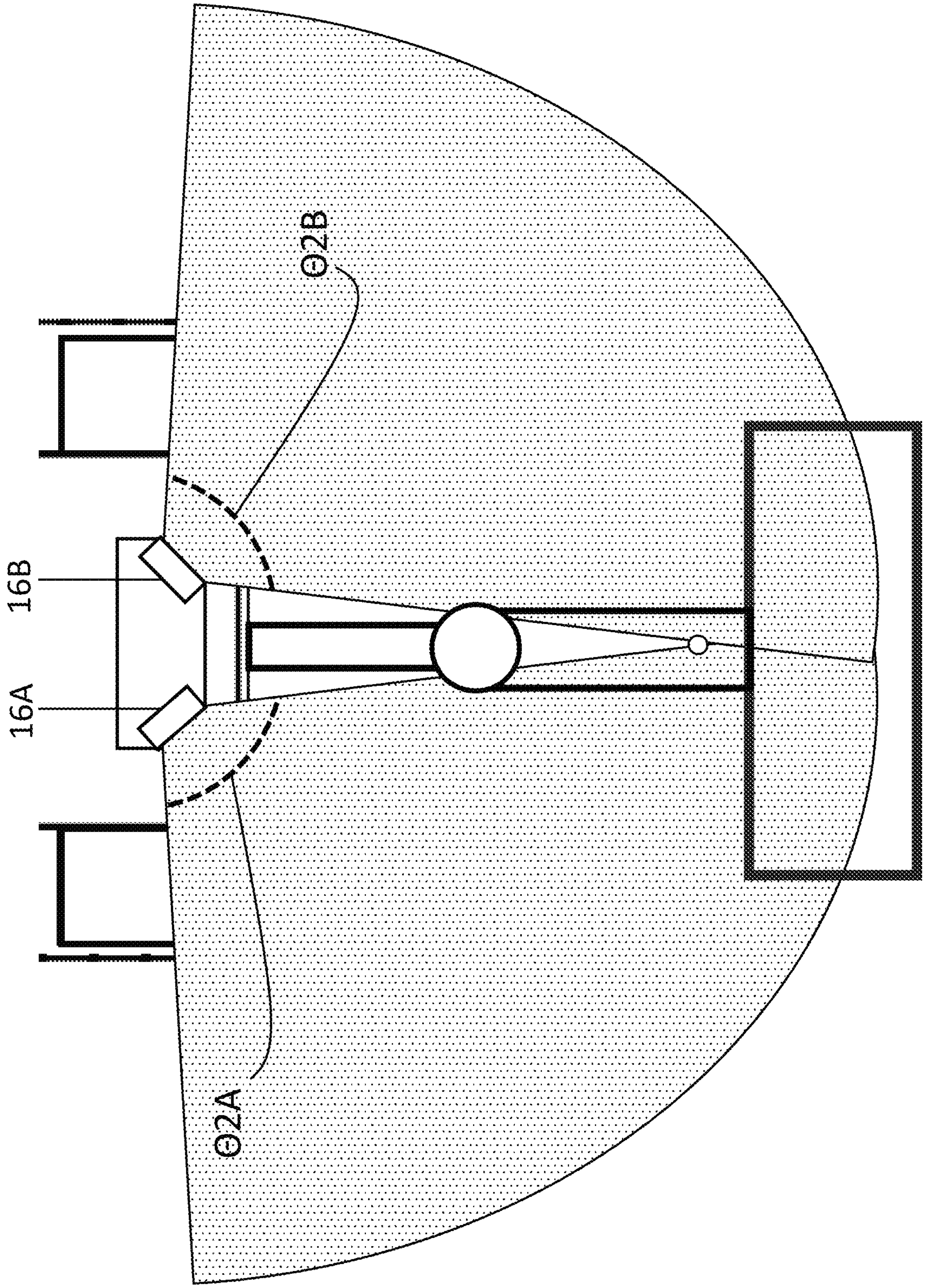
FIG. 8H is a plan view of a tractor.

FIG. 8H shows an example in which the status calculator device 62 determines that it is not possible to determine a position and an attitude of the working device 2. For example, in FIG. 8H, the first marker bundle 12A and the second marker bundle 12B have both fallen off the working device 2. However, this is not a limiting example. For instance, the status calculator device 62 can determine that it is not possible to determine a position and an attitude of the working device 2 when, for example, the first camera 16A and the second camera 16B have fallen off the tractor 1, the first camera 16A and the second camera 16B are not functioning, or each of the markers 14A-D on the first marker bundle 12A and the each of the markers 14E-H of the second marker bundle 12B are obscured (e.g., by mud).

The status calculator device 62 calculates the position of the working device 2 as the status of the working device 2. According to this configuration, the position of the working device 2 can be easily ascertained, and when farming in a field or in an orchard, the position of the working device 2 can be ascertained without a positioning device that detects its position based on signals from a positioning satellite on the working device 2.

In addition, even when a positioning device is installed in the working device 2, the position can be determined instead of the positioning device even when the receiving intensity of the positioning satellite signal is low.

In a preferred embodiment, the working vehicle 1 is provided with the positioning device 40, wherein the traveling machine body 3 is the position of the traveling machine body 3, and the status calculator device 62 calculates the equipment position, which is the position of the working device 2, based on the vehicle position calculated at the detected position and on the status of the working device 2.

According to this configuration, the latitude and longitude can be determined using the vehicle body position calculated by the positioning device.

In a preferred embodiment of the present invention, a portion or an entirety of each of the controller 60 and/or the functional units or blocks thereof as described herein with respect to the various preferred embodiments of the present invention can be implemented in one or more circuits or circuitry, such as an integrated circuit(s) or as an LSI (large scale integration). For example, the controller 60 can include one or more circuits or circuitry such as a microprocessor, a microcontroller, a multi-core processor, a central processing unit (CPU), a graphics processing unit (GPU), and a superscalar processor, for example, in forms such as semiconductor integrated circuit chip packages, semiconductor integrated circuit modules, and single-board computers that can operate in connection with built-in or external memory. Each functional unit or block of each of the controller 60 may be individually made into an integrated circuit chip. Alternatively, a portion or an entirety of the functional units or blocks of each of the controller 60 may be integrated and made into an integrated circuit chip. Additionally, the method of forming a circuit or circuitry defining each of the controller 60 is not limited to LSI, and an integrated circuit may be implemented by a dedicated circuit or one or more general-purpose processor or controller that is specifically programed to define a special-purpose processor or controller to perform one or more of the functions, operations, steps, or processes disclosed herein. Further, if a technology or technologies for forming an integrated circuit, which replaces LSI, arises as a result of advances in semiconductor technology, an integrated circuit formed by that technology may be used. In a preferred embodiment, the controller 60 and the various possible corresponding structures disclosed herein provide non-limiting examples that correspond to the "controller" recited in claims of this patent application.

Furthermore, a program which is operated in each of the controller 60 and/or other elements of various preferred embodiments of the present invention, is a program (e.g., a program causing a computer to perform a function or functions, operations, steps, or processes) controlling a controller, in order to realize one or more functions, operations, steps, or processes of the various preferred embodiments according to the present invention, including each of the various circuits or circuitry described herein and recited in the claims. Further, information which is handled by the controller may be temporarily accumulated in a RAM at the time of the processing. Thereafter, the information is stored in various types of circuitry in the form of ROMs and HDDs, and is read out by circuitry within, or included in combination with, the controller 60 as necessary, and modification or write-in may be performed thereto. Examples of a recording medium storing the program or programs can include integrated circuits on a same semiconductor chip that makes up the controller 60, integrated circuits formed on a different semiconductor chip from the controller 60, or various storage media that can communicate data and address signals via a network bus. As a recording medium storing the program or programs, any one of, or a combination of, a semiconductor medium (for example, the ROM, a nonvolatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions, operations, steps, or processes of the various preferred embodiments of the present invention are not only realized, but the functions, operations, steps, or processes of preferred embodiments of the present invention may be realized by processing the loaded program in combination with an operating system or other application programs, based on an instruction of the program.

Moreover, in a case of being distributed in a market, the program or programs can be distributed by being stored in a portable recording medium, or the program or programs can be transmitted to a server computer which is connected through a network such as the Internet. In this case, a storage device of the general purpose or special purpose computer is also included in preferred embodiments of the present invention. In addition, in the preferred embodiments described above, a portion or an entirety of the various functional units or blocks may be realized as an LSI which is typically an integrated circuit. Each functional unit or block of the controller may be individually chipped, or a portion thereof, or the whole thereof may be chipped by being integrated. In a case of making each functional block or unit as an integrated circuit, an integrated circuit controller that controls the integrated circuits, may be added.

Additionally, the method for making an integrated circuit is not limited to the LSI, and may be realized by a single-purpose circuit or a general-purpose processor that is programmable to perform the functions described above to define a special-purpose computer. Moreover, in a case of an appearance of a technology for making an integrated circuit which replaces the LSI due to an advance of a semiconductor technology, it is possible to use an integrated circuit depending on the technology.

Finally, it should be noted that the description and recitation in claims of this patent application referring to "CPU", "control unit", "computer", "processor", "microprocessor", "controller", "circuit", or "circuitry" is in no way limited to an implementation that is hardware only, and as persons of ordinary skill in the relevant art would know and understand, such descriptions and recitations of "CPU", "control unit", "computer", "processor", "microprocessor", "controller", "circuit", or "circuitry" include combined hardware and software implementations in which the controller, circuit, or circuitry is operative to perform functions and operations based on machine readable programs, software or other instructions in any form that are usable to operate the controller, circuit, or circuitry.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:

a traveling body including a coupler to which a working device is connected;

a first camera attached to the traveling body;

a second camera attached to the traveling body;

a first marker attached to the working device;

a second marker attached to the working device;

a controller configured or programmed to determine a status of the working device based on detection data detected by the first camera and/or the second camera; wherein the first camera faces a rearward direction and a first outward direction of the working vehicle;

the second camera faces the rearward direction and a second outward direction of the working vehicle opposite to the first outward direction of the working vehicle;

an innermost portion of the first marker is located outside of the first camera in a left-right direction of the working vehicle when the working device has a straight posture with respect to the traveling body;

an innermost portion of the second marker is located outside of the second camera in the left-right direction of the working vehicle when the working device has the straight posture with respect to the traveling body;

when the working device has the straight posture with respect to the traveling body, the first marker is located within a first angle of view of the first camera;

when the working device has the straight posture with respect to the traveling body, the second marker is located within a second angle of view of the second camera;

when the first marker is not located within the first angle of view of the first camera, and the first marker and the second marker are located within the second angle of view of the second camera, the controller is configured or programmed to determine the status of the working device based on the first marker and the second marker detected by the second camera; and when the second marker is not located within the second angle of view of the second camera, and the first marker and the second marker are located within the first angle of view of the first camera, the controller is configured or programmed to determine the status of the working device based on the first marker and the second marker detected by the first camera.

2. The working vehicle according to claim 1, wherein a first inner edge of the first angle of view of the first camera extends in an inward direction; and a second inner edge of the second angle of view of the second camera extends in an inward direction.

3. The working vehicle according to claim 2, wherein the first inner edge of the first angle of view of the first camera intersects the second inner edge of the second angle of view of the second camera at an intersection point that is located forward of the first marker and the second marker in a front-rear direction of the working vehicle when the working device has the straight posture with respect to the traveling body.

4. The working vehicle according to claim 1, wherein the first marker includes a plurality of first markers located side by side on a first marker bundle; and the second marker includes a plurality of second markers located side by side on a second marker bundle.

5. The working vehicle according to claim 4, wherein each of the plurality of first markers have a same length in a width direction and a same length in a vertical direction; and a distance between the plurality of first markers is less than a distance between the plurality of first markers and a side of the first marker bundle.

6. The working vehicle according to claim 1, wherein the controller is configured or programmed to perform object detection and/or autonomous navigation based on detection data from the first camera and the second camera.

7. A working vehicle comprising:

a traveling body including a coupler to which a working device is connected;

a first camera attached to the traveling body;

a second camera attached to the traveling body;

a first marker attached to the working device;

a second marker attached to the working device;

a controller configured or programmed to determine a status of the working device based on detection data detected by the first camera and/or the second camera; wherein the first camera faces a rearward direction and a first outward direction of the working vehicle;

the second camera faces the rearward direction and a second outward direction of the working vehicle opposite to the first outward direction of the working vehicle;

an innermost portion of the first marker is located outside of the first camera in a left-right direction of the working vehicle when the working device has a straight posture with respect to the traveling body;

an innermost portion of the second marker is located outside of the second camera in the left-right direction of the working vehicle when the working device has the straight posture with respect to the traveling body;

when the working device has the straight posture with respect to the traveling body, the first marker is located within a first angle of view of the first camera and is not located within a second angle of view of the second camera; and when the working device has the straight posture with respect to the traveling body, the second marker is located within the second angle of view of the second camera and is not located within the first angle of view of the first camera.

8. A working vehicle comprising:

a traveling body including a coupler to which a working device is connected;

a first camera attached to the traveling body;

a second camera attached to the traveling body:

a first marker attached to the working device;

a second marker attached to the working device;

a controller configured or programmed to determine a status of the working device based on detection data detected by the first camera and/or the second camera; wherein the first camera faces a rearward direction and a first outward direction of the working vehicle;

the second camera faces the rearward direction and a second outward direction of the working vehicle opposite to the first outward direction of the working vehicle;

an innermost portion of the first marker is located outside of the first camera in a left-right direction of the working vehicle when the working device has a straight posture with respect to the traveling body;

an innermost portion of the second marker is located outside of the second camera in the left-right direction of the working vehicle when the working device has the straight posture with respect to the traveling body;

the first marker includes a plurality of first markers located side by side on a first marker bundle;

the second marker includes a plurality of second markers located side by side on a second marker bundle;

when the working device has the straight posture with respect to the traveling body, the first marker bundle is located within a first angle of view of the first camera;

when the working device has the straight posture with respect to the traveling body, the second marker bundle is located within a second angle of view of the second camera;

when the first marker bundle is not located within the first angle of view of the first camera, and the first marker bundle and the second marker bundle are located within the second angle of view of the second camera, the controller is configured or programmed to determine the status of the working device based on the first marker bundle and the second marker bundle detected by the second camera; and when the second marker bundle is not located within the second angle of view of the second camera, and the first marker bundle and the second marker bundle are located within the first angle of view of the first camera, the controller is configured or programmed to determine the status of the working device based on the first marker bundle and the second marker bundle detected by the first camera.

* * * * *